United States Patent
Hadano

(10) Patent No.: US 9,696,948 B2
(45) Date of Patent: Jul. 4, 2017

(54) PRINTING SYSTEM, PRINTING SERVICE APPARATUS, IMAGE FORMING APPARATUS, CONTROL METHOD, AND STORAGE MEDIUM

(71) Applicant: CANON KABUSHIKI KAISHA, Tokyo (JP)

(72) Inventor: Masahiro Hadano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 14/271,829

(22) Filed: May 7, 2014

(65) Prior Publication Data
US 2014/0355049 A1 Dec. 4, 2014

(30) Foreign Application Priority Data
May 30, 2013 (JP) .................... 2013-114266

(51) Int. Cl.
G06F 3/12 (2006.01)
(52) U.S. Cl.
CPC ............ G06F 3/123 (2013.01); G06F 3/1203 (2013.01); G06F 3/1209 (2013.01); G06F 3/1287 (2013.01)
(58) Field of Classification Search
None
See application file for complete search history.

(56) References Cited

U.S. PATENT DOCUMENTS

| | | | |
|---|---|---|---|
| 2004/0030768 A1* | 2/2004 | Krishnamoorthy | H04L 29/06 709/223 |
| 2007/0083625 A1* | 4/2007 | Chamdani | H04Q 3/66 709/223 |
| 2008/0243862 A1* | 10/2008 | Pathak et al. | 707/10 |

FOREIGN PATENT DOCUMENTS

JP 2000-194544 A 7/2000

OTHER PUBLICATIONS

Translation for JP 2000-194544.*

* cited by examiner

Primary Examiner — Mohammad Ghayour
Assistant Examiner — Lennin Rodriguezgonzale
(74) Attorney, Agent, or Firm — Canon U.S.A., Inc. IP Division

(57) ABSTRACT

A printing system, when information about an image forming apparatus is registered in a printing service apparatus or when information about the image forming apparatus already registered in the printing service apparatus is updated, determines whether firmware installed in the image forming apparatus corresponds to the printing service apparatus. If the firmware installed in the image forming apparatus is determined not to correspond, the printing system determines whether firmware corresponding to the printing service apparatus exists in firmware of the image forming apparatus distributed by the distribution server. If the firmware corresponding to the printing service apparatus is determined to exist and when that firmware is distributed from the distribution server to the image forming apparatus, the printing system installs the distributed firmware.

7 Claims, 24 Drawing Sheets

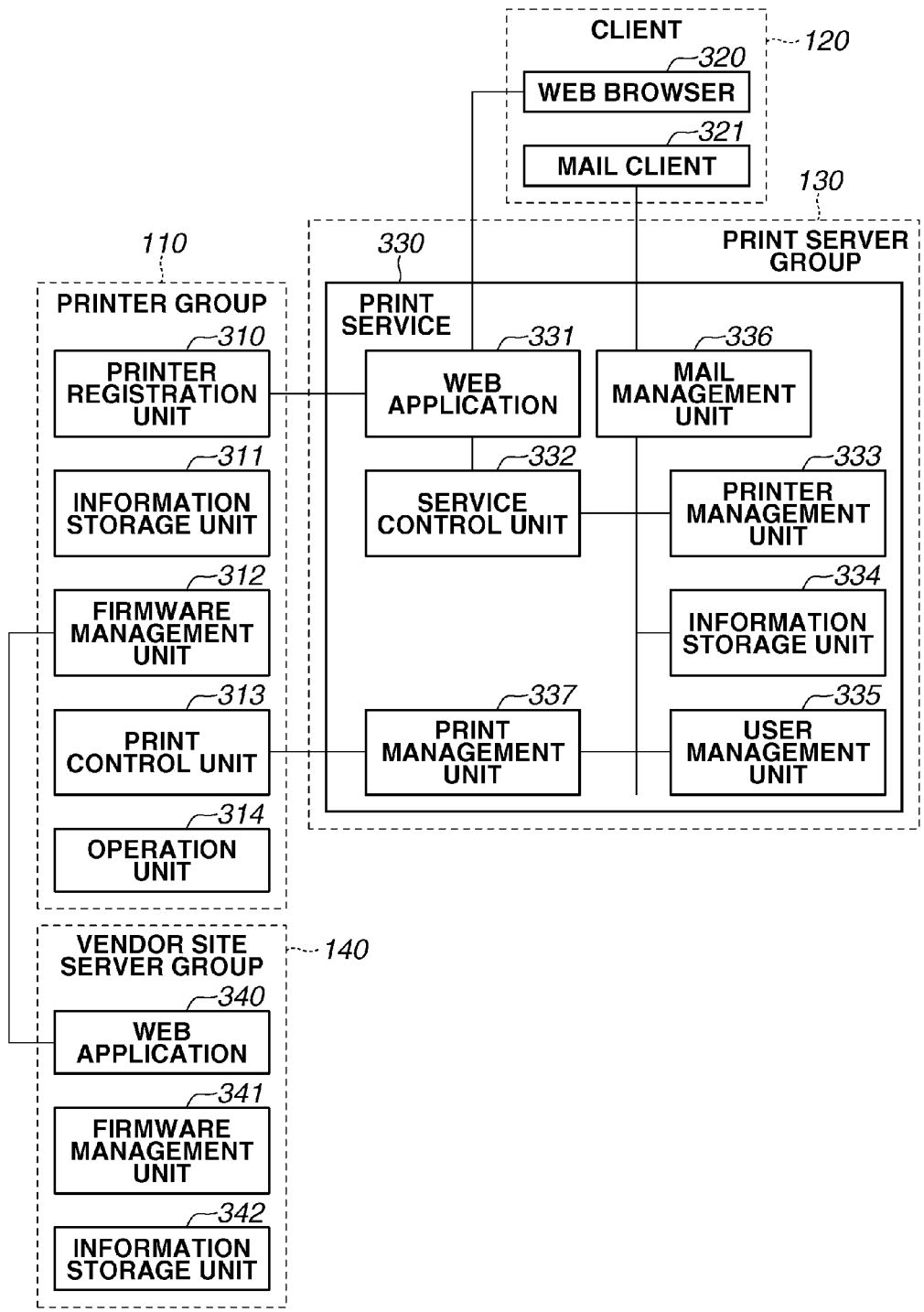

FIG.4A

| USER ACCOUNT | PASSWORD | NOTIFICATION DESTINATION MAIL ADDRESS |
|---|---|---|
| USER A | 111111 | userA@xxxxxxx.xxx |
| USER B | 222222 | userB@yyyyyyy.yyy |

| PRINTER NAME | PRINTER ID | IP ADDRESS | PRINTER MODEL NAME | FIRMWARE VERSION | API VERSION | VENDOR URL | ADMINISTRATOR USER ACCOUNT |
|---|---|---|---|---|---|---|---|
| PRINTER A | XX:XX:XX:XX:XX:XX | XXX.XXX.XXX.XXX | PRI-1000 | 1.0 | 1.0 | http://www.xxxx.yyyy.com/firm/ | USER A |
| PRINTER B | YY:YY:YY:YY:YY:YY | YYY.YYY.YYY.YYY | XXPrinter | 2.0 | 1.2 | http://www.aaaa.bbbb.com/firm/ | USER A |
| PRINTER C | ZZ:ZZ:ZZ:ZZ:ZZ:ZZ | ZZZ.ZZZ.ZZZ.ZZZ | AAA-Print-200 | 60.0 | 2.0 | http://www.ddd.eeee.com/firm/ | USER A |

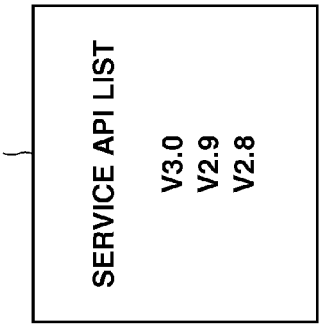

SERVICE API LIST

| PRINTER NAME (431) | FIRST API VERSION CHECK (432) | SECOND API VERSION CHECK (433) |
|---|---|---|
| PRINTER A | False | True |
| PRINTER B | False | True |
| PRINTER C | False | True |

FIG.5B

| PRINTER MODEL NAME (441) | APPROPRIATE FIRMWARE VERSION (442) | CORRESPONDING SERVICE API VERSION OF APPROPRIATE FIRMWARE (443) |
|---|---|---|
| AAA-Print-200 | 70.0 | 3.0 |

FIG.5C

| PRINTER NAME (451) | PRINTER MODEL NAME (452) | APPROPRIATE FIRMWARE 1 (453) | CORRESPONDING API VERSION OF APPROPRIATE FIRMWARE 1 (454) | APPROPRIATE FIRMWARE 2 (453) | CORRESPONDING API VERSION OF APPROPRIATE FIRMWARE 2 (454) |
|---|---|---|---|---|---|
| PRINTER C | AAA-Print-200 | 70.0 | 3.0 | 70.1 | 3.0 |

FIG.5D

| PRINTER MODEL NAME (461) | FIRMWARE VERSION (462) | API VERSION (463) | VENDOR URL (464) | THIRD API VERSION CHECK (465) |
|---|---|---|---|---|
| PRI-1000 | 10.0 | 1.0 | http://www.xxxx.yyyy.com/firm/ | INAPPROPRIATE |
| XXPrinter | 20.5 | 1.2 | http://www.aaaa.bbbb.com/firm/ | INAPPROPRIATE |
| AAA-Print-200 | 60.0 | 2.0 | http://www.dddd.eeee.com/firm/ | INAPPROPRIATE |

FIG.5E

| PRINTER MODEL NAME (461) | FIRMWARE VERSION (462) | API VERSION (463) | VENDOR URL (464) | THIRD API VERSION CHECK (465) |
|---|---|---|---|---|
| PRI-1000 | 10.0 | 1.0 | http://www.xxxx.yyyy.com/firm/ | INAPPROPRIATE |
| XXPrinter | 20.5 | 1.2 | http://www.aaaa.bbbb.com/firm/ | INAPPROPRIATE |
| AAA-Print-200 | 60.0 | 2.0 | http://www.dddd.eeee.com/firm/ | INAPPROPRIATE |
| AAA-Print-200 | 70.0 | 3.0 | http://www.dddd.eeee.com/firm/ | APPROPRIATE |
| AAA-Print-200 | 70.1 | 3.0 | http://www.dddd.eeee.com/firm/ | APPROPRIATE |

FIG.6A

| PRINTER NAME (501) | PRINTER ID (502) | IP ADDRESS (503) | PRINTER MODEL NAME (504) | VENDOR URL (505) |
|---|---|---|---|---|
| PRINTER C | ZZ:ZZ:ZZ:ZZ:ZZ:ZZ | ZZZZZ.ZZZ.ZZZ | AAA-Print-200 | http://www.dddd.eeee.com/firm/ |

FIG.6B

| SERVICE NAME (511) | SERVICE URL (512) | SERVICE API VERSION (513) |
|---|---|---|
| PRINT SERVICE | http://www.dddd.eeee.com/firm/ | 2.8, 2.9, 3.0 |

FIG.6C

| PRINTER MODEL NAME (521) | FIRMWARE VERSION (522) | USABLE SERVICE NAME (523) | CORRESPONDING SERVICE API VERSION (524) | APPROPRIATE FIRMWARE VERSION (525) | USABLE SERVICE NAME OF APPROPRIATE FIRMWARE (526) | CORRESPONDING SERVICE API VERSION OF APPROPRIATE FIRMWARE (527) |
|---|---|---|---|---|---|---|
| AAA-Print-200 | 60.0 | PRINT SERVICE | 2.0 | 70.1 | PRINT SERVICE | 3.0 |

FIG.6D

| SERVICE NAME (531) | FIRST API VERSION CHECK (532) | SECOND API VERSION CHECK (533) |
|---|---|---|
| PRINT SERVICE | False | True |

FIG.6E

PRINTER MODEL NAME (AAA-Print-200) (541)

| FIRMWARE VERSION (542) | CORRESPONDING API VERSION (543) |
|---|---|
| V70.1 | V3.0 |
| V70.0 | V3.0 |
| V60.0 | V2.0 |

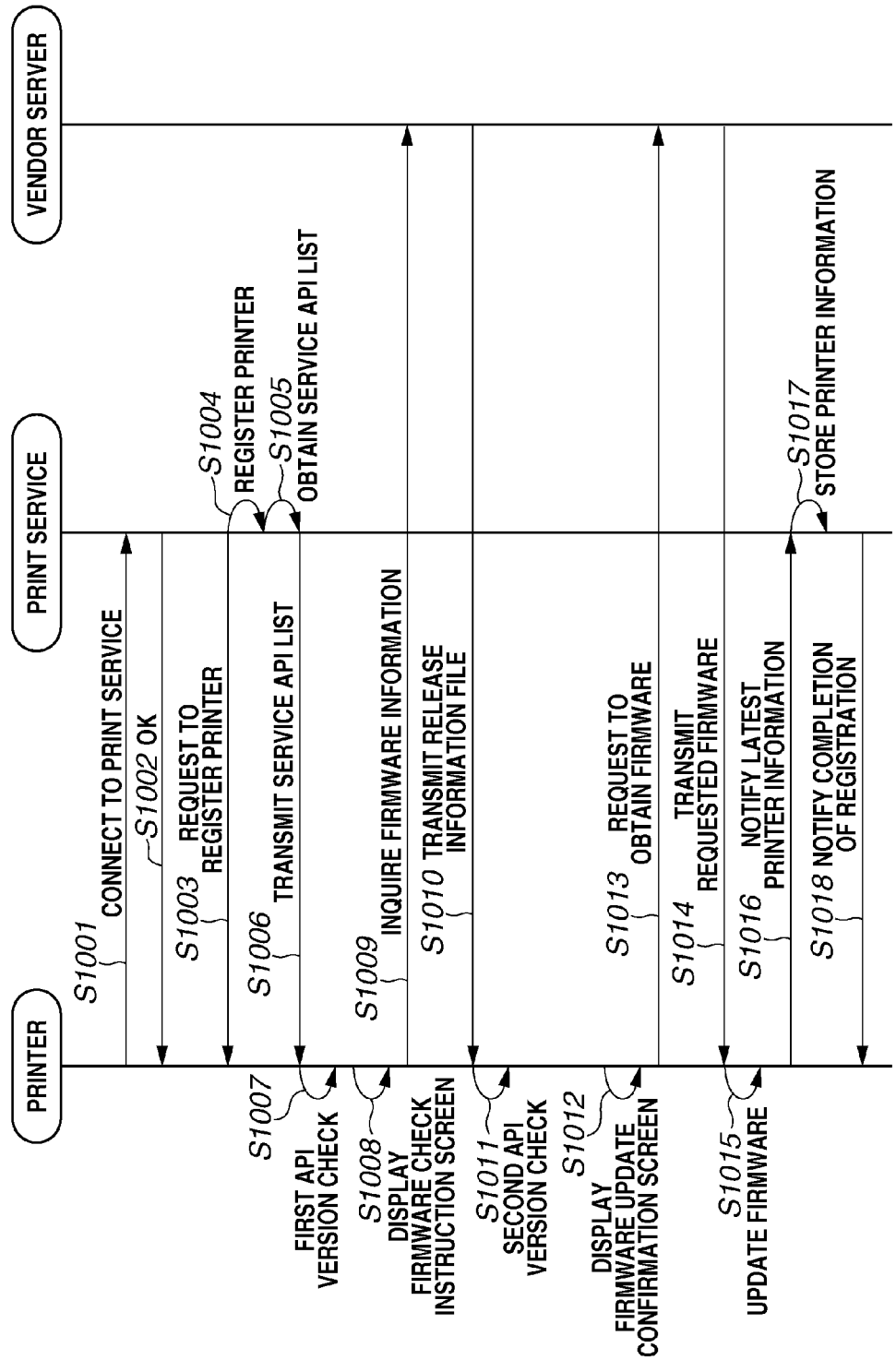

FIG.11A

FIRMWARE COMPLIANT WITH SERVICE API IS FOUND ON VENDOR SERVER, BUT NOT INTENDED FOR THIS PRINTER. FIRMWARE OF PRINTER COMPLIANT WITH SERVICE API HAS NOT BEEN RELEASED ON VENDOR SERVER YET.
(XX XX, 20XX)

REGISTERED PRINTER DOES NOT SUPPORT API APPROPRIATE FOR PRINT SERVICE.
FIRMWARE UPDATE IS RECOMMENDED. FIRMWARE COMPLIANT WITH SERVICE HAS NOT BEEN RELEASED ON VENDOR SERVER YET.
(XX XX, 20XX)

OK —909

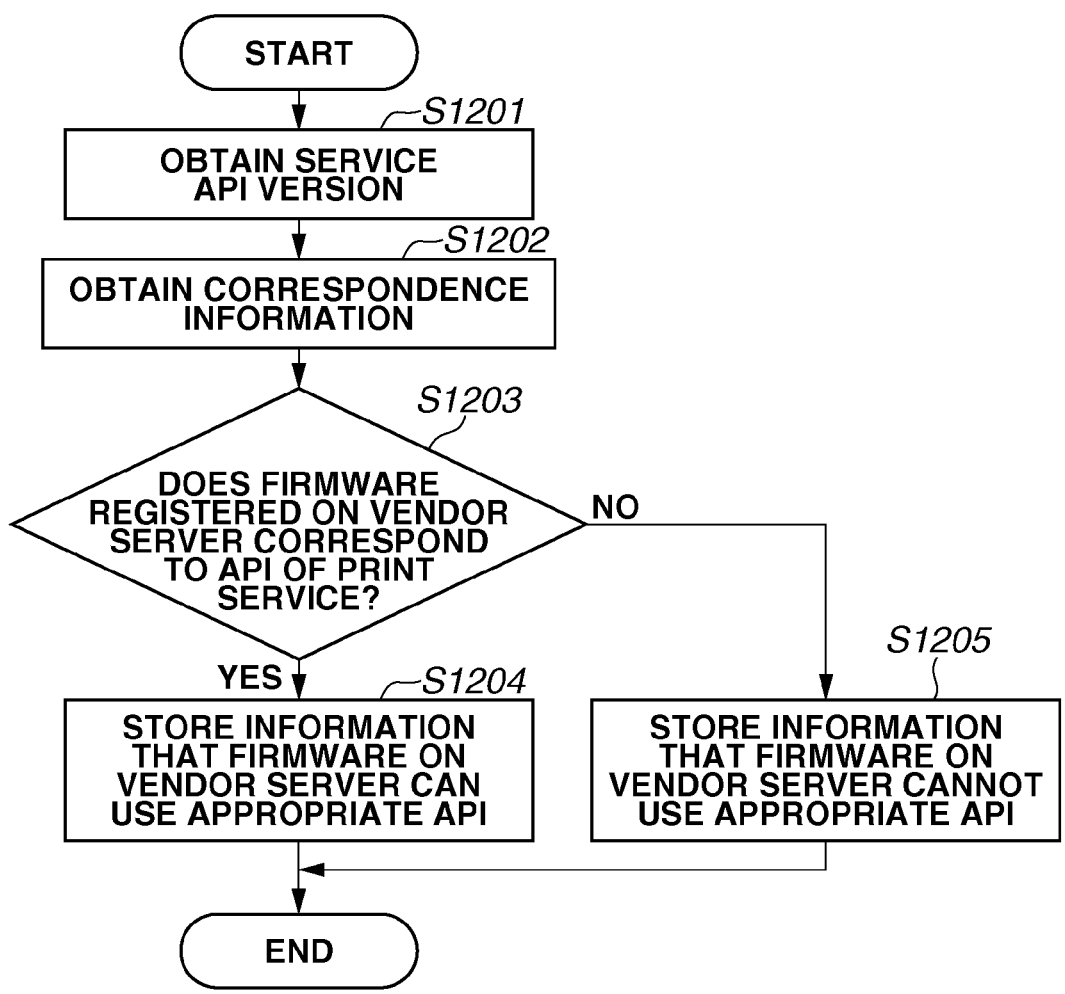

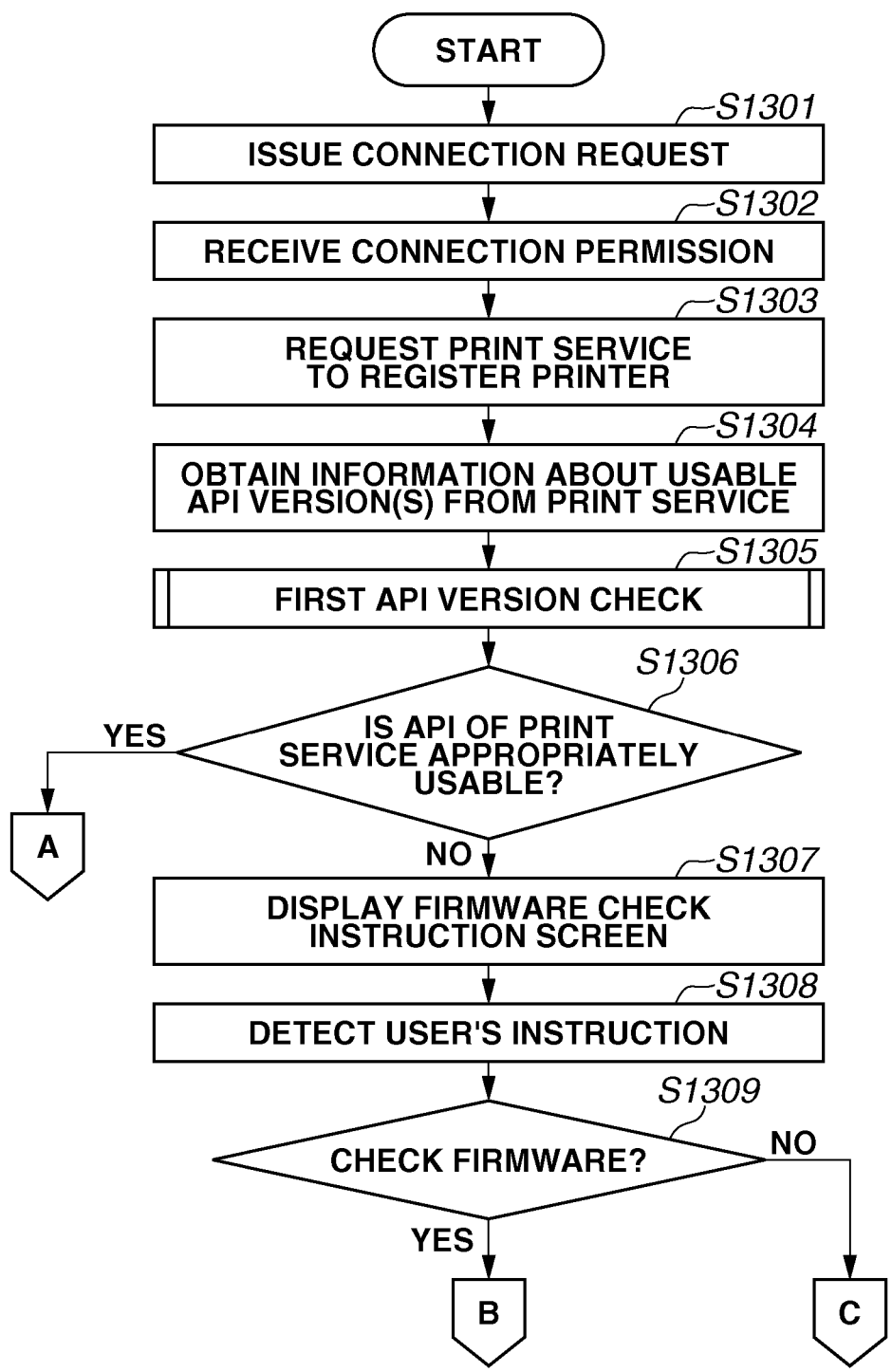

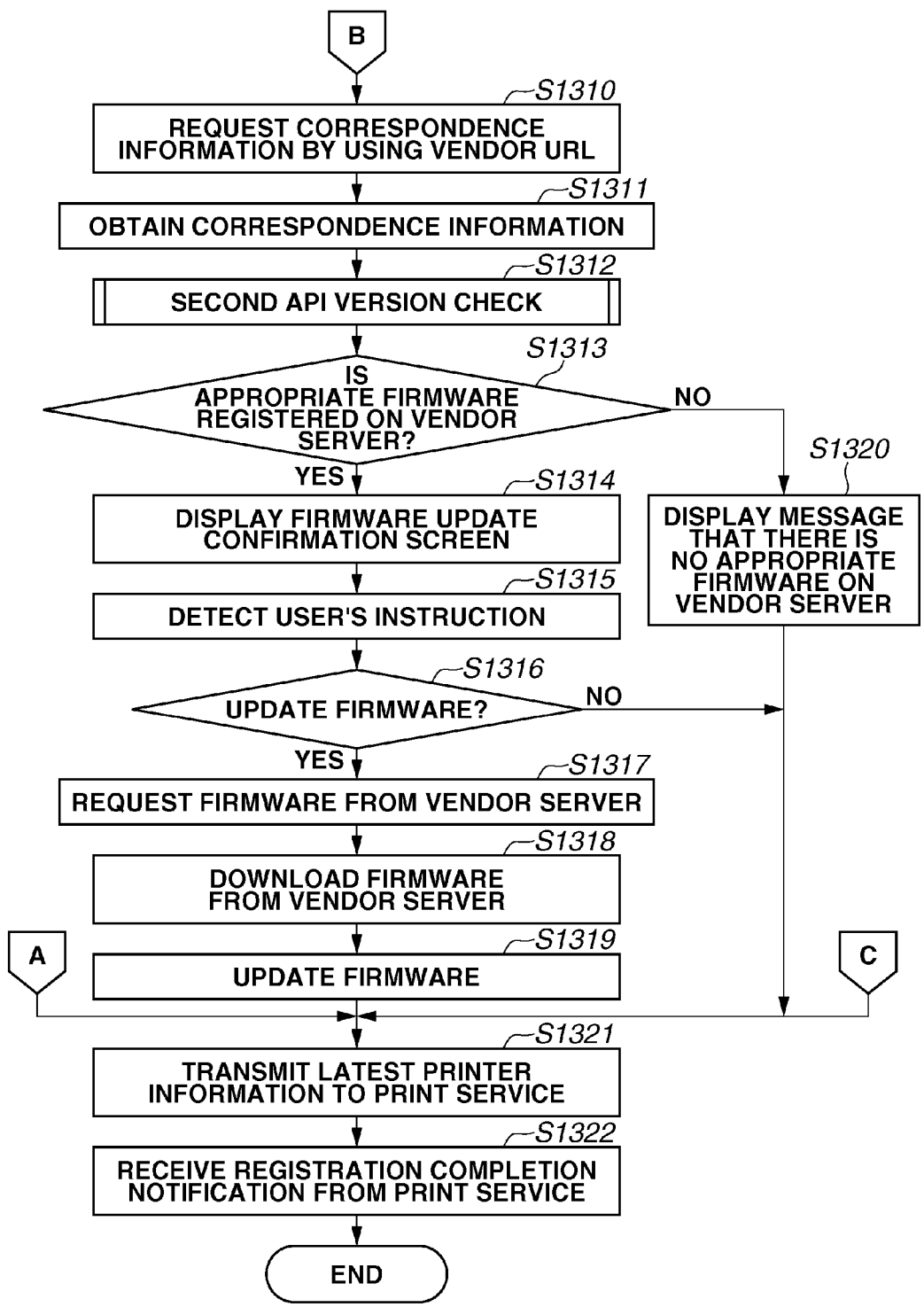

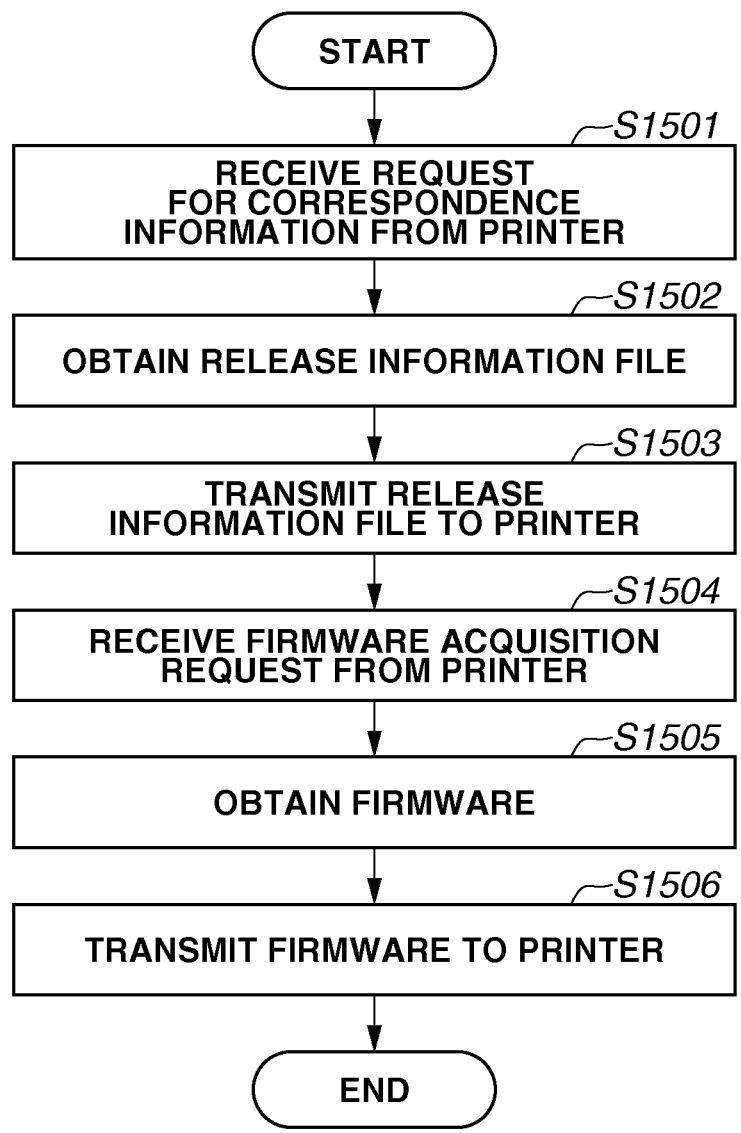

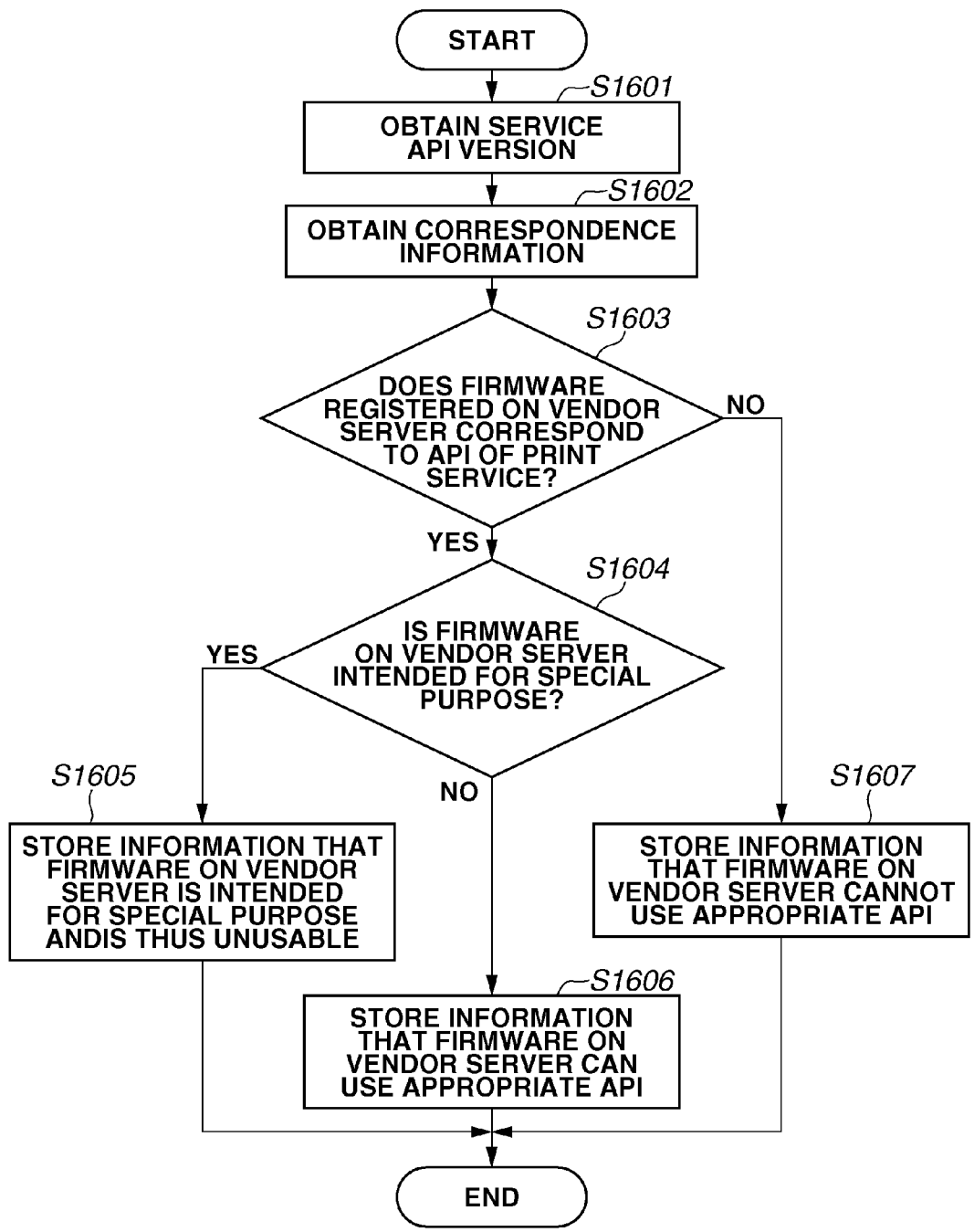

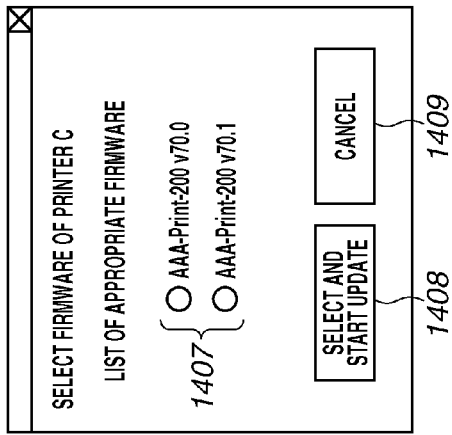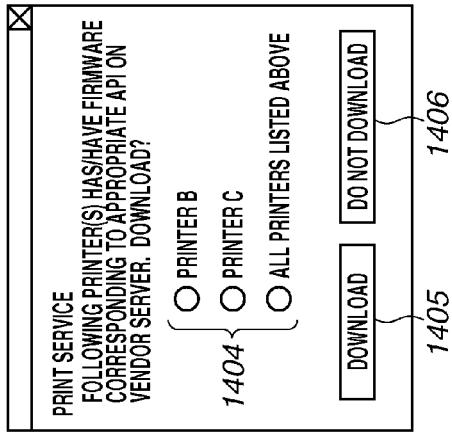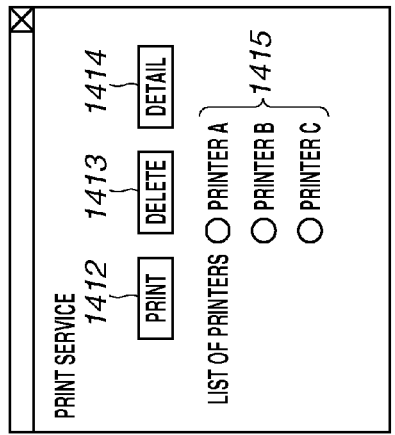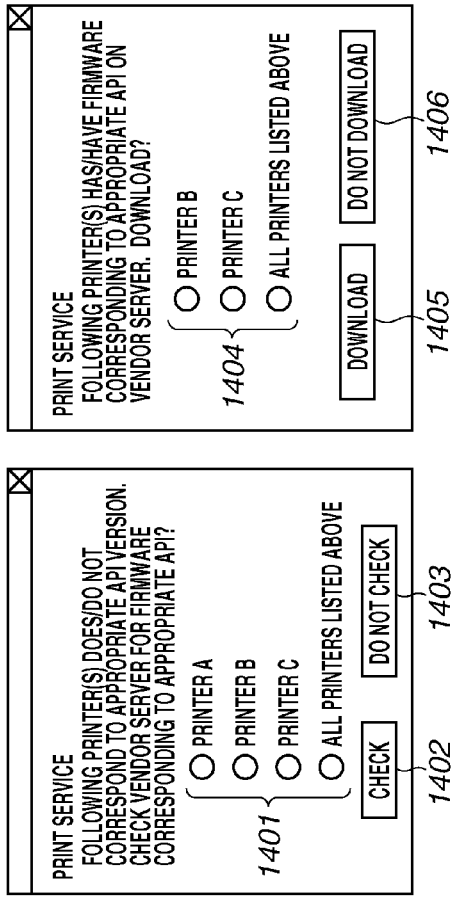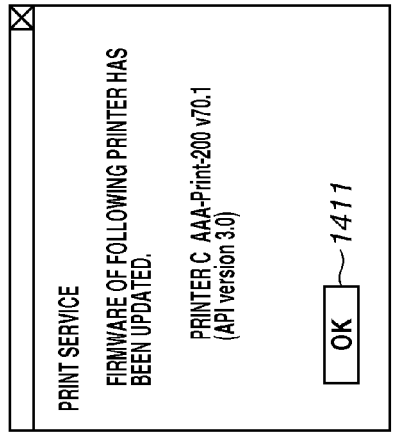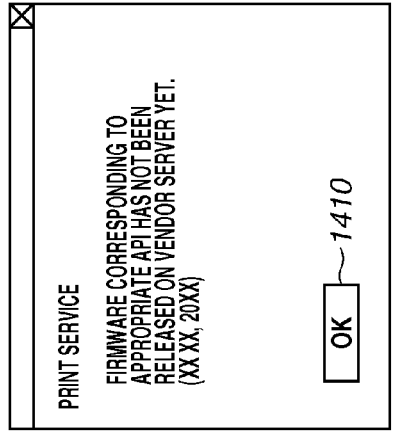

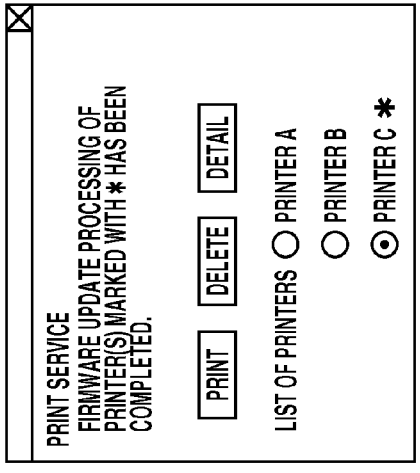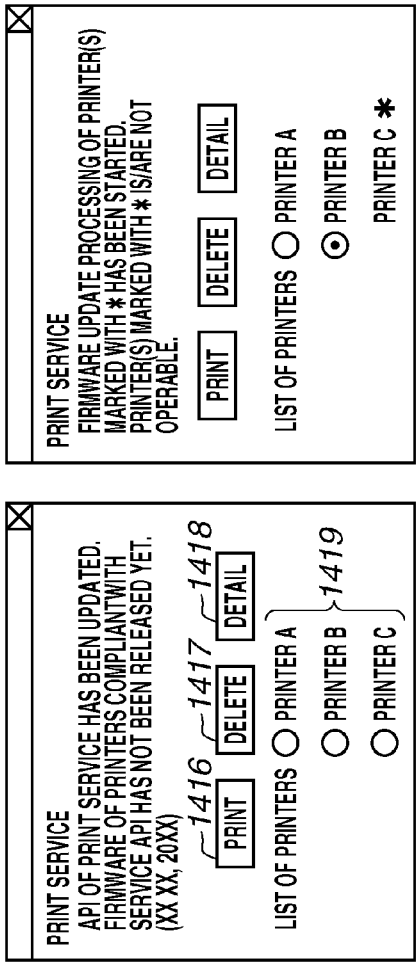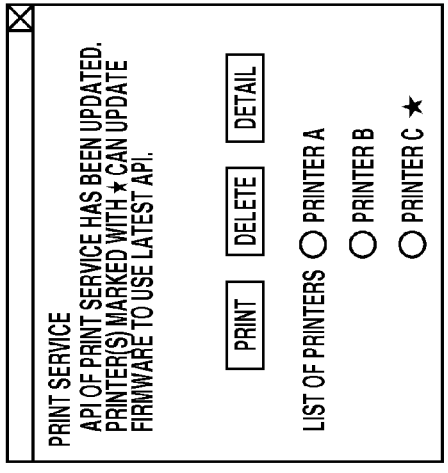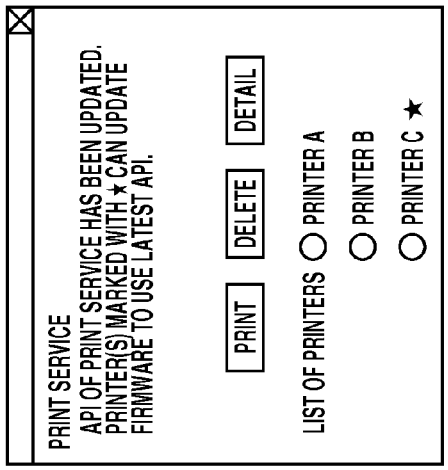

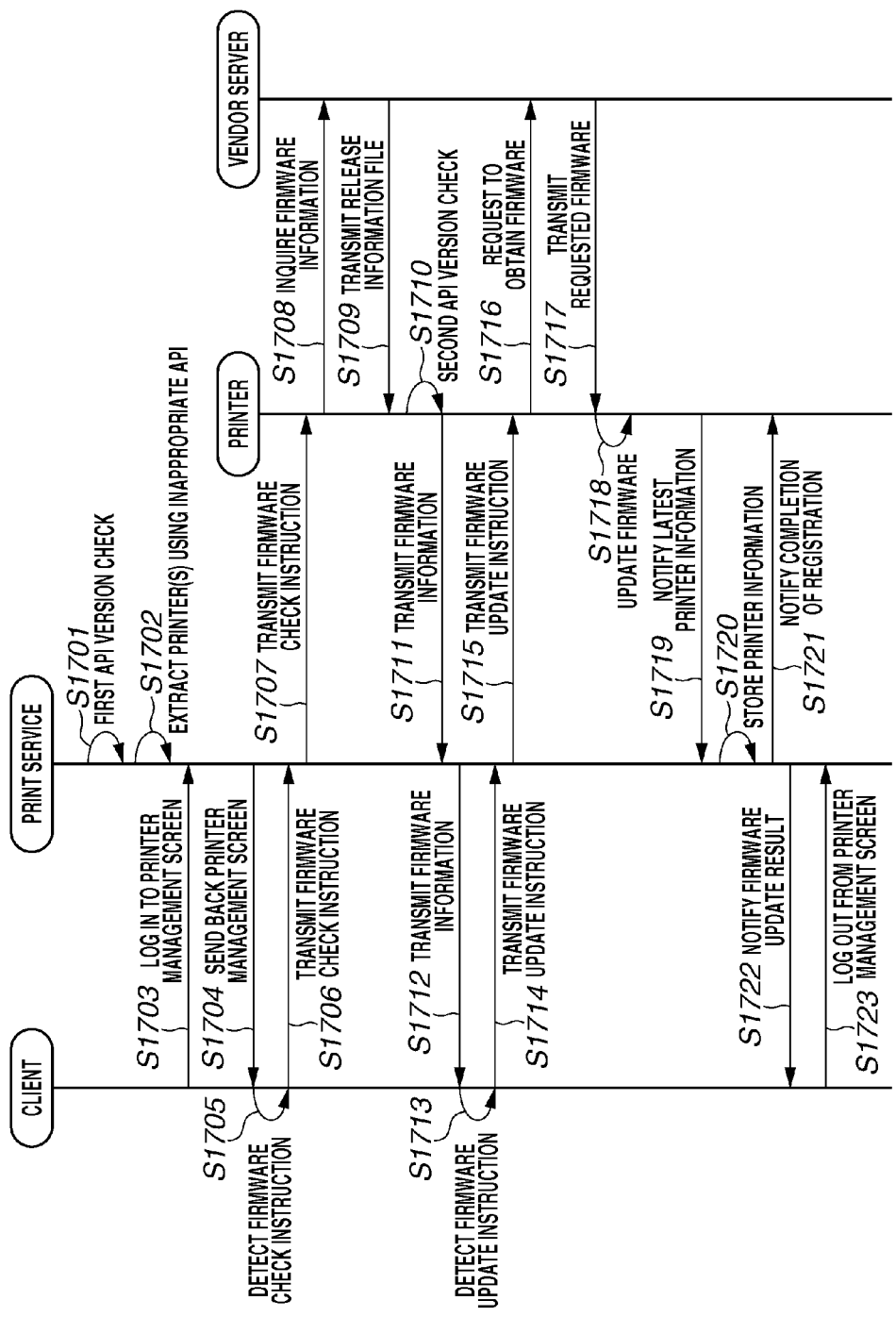

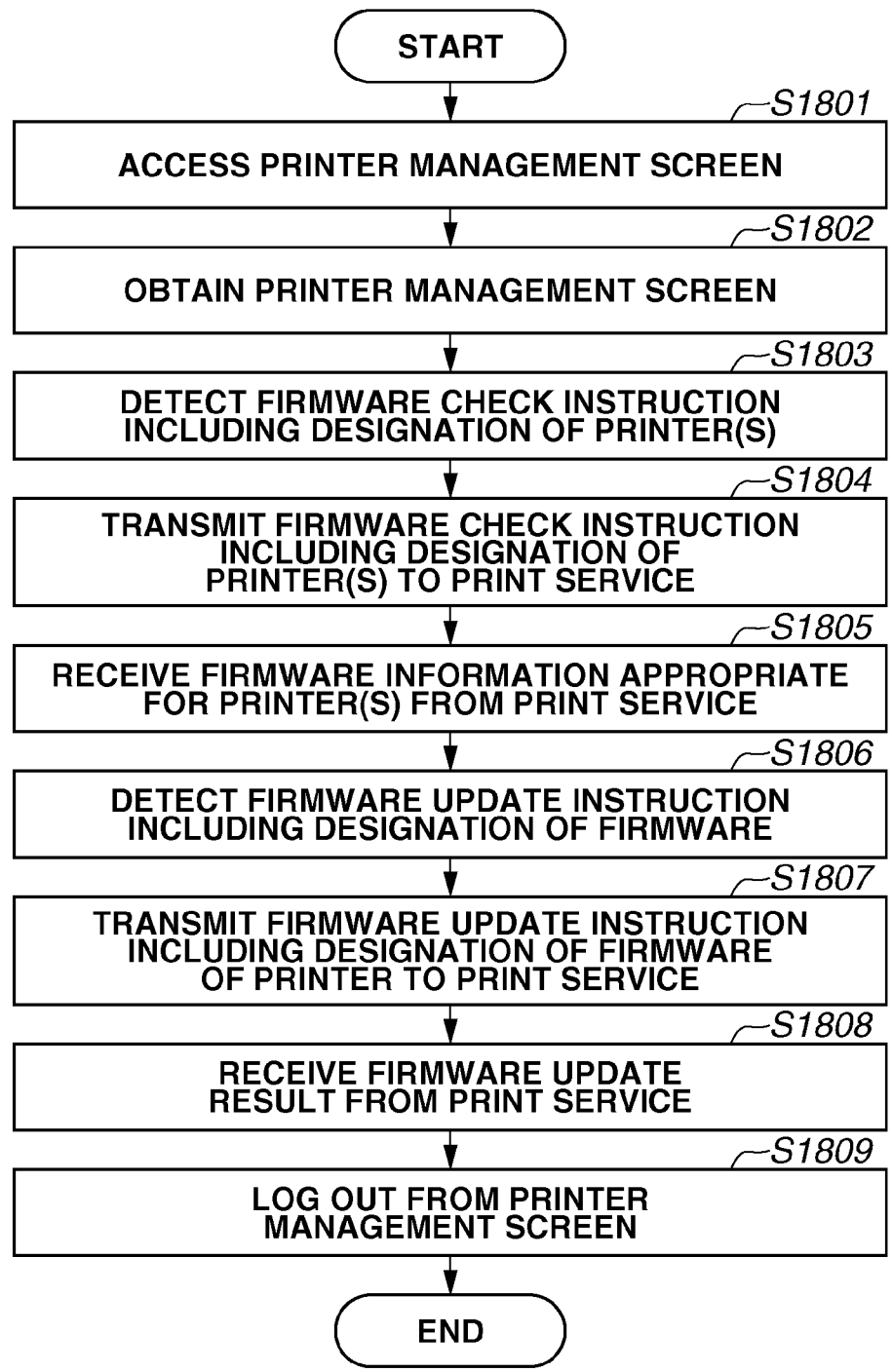

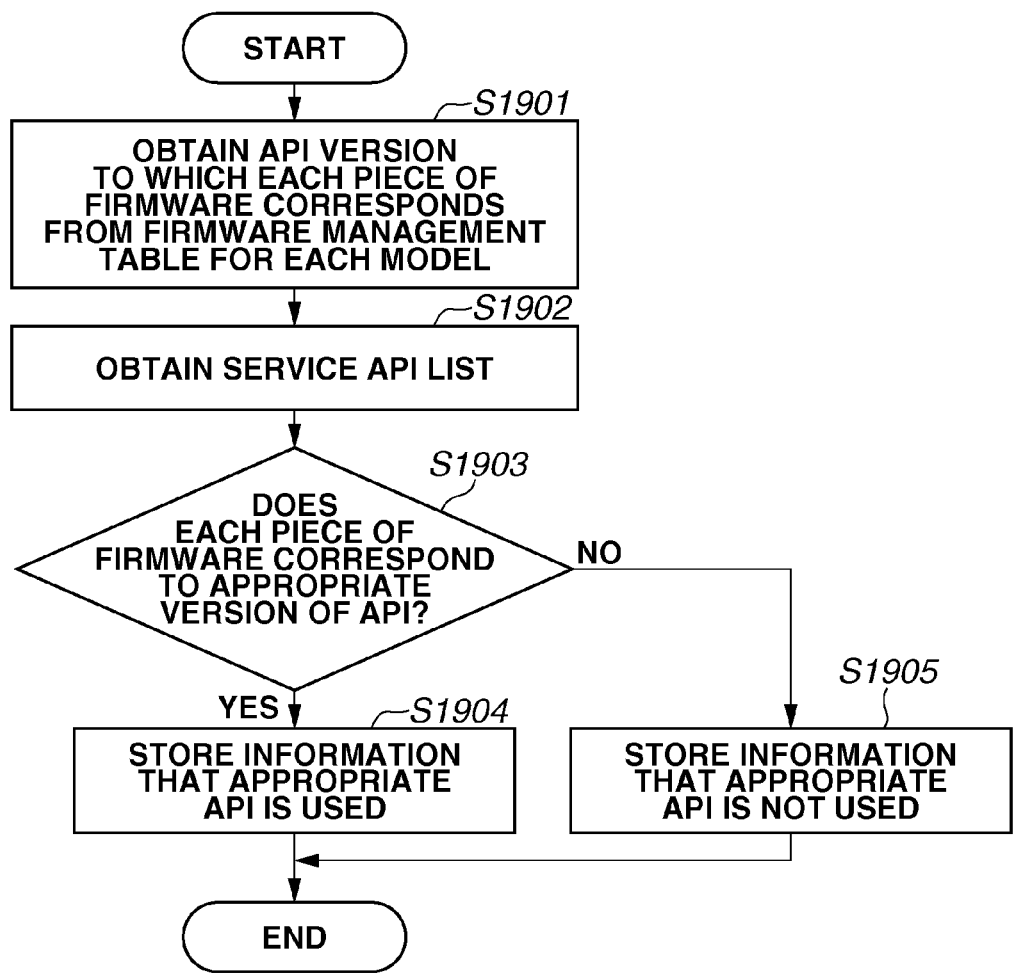

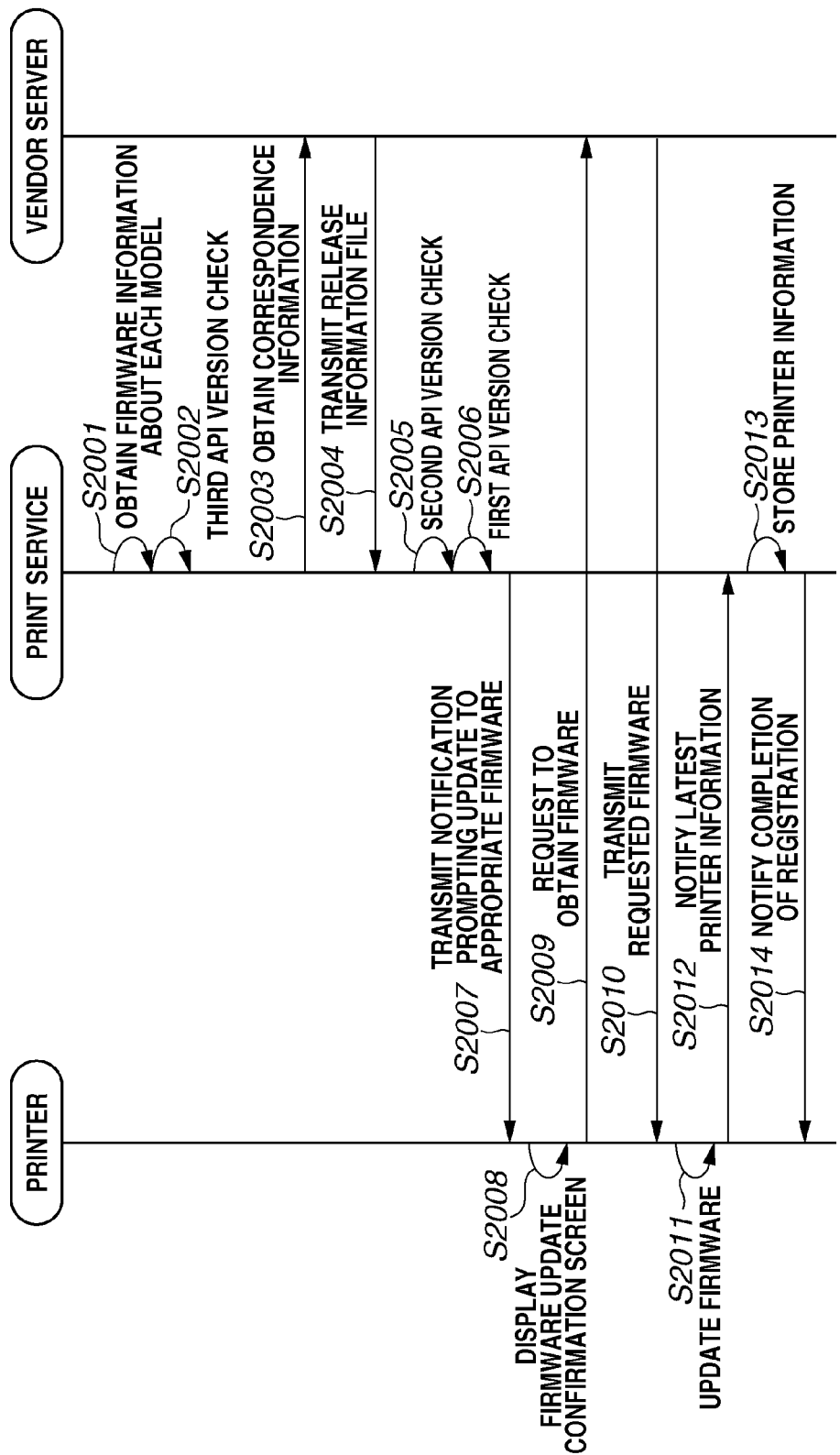

PRINTING SYSTEM, PRINTING SERVICE APPARATUS, IMAGE FORMING APPARATUS, CONTROL METHOD, AND STORAGE MEDIUM

BACKGROUND OF THE INVENTION

Field of the Invention

The present invention relates to a printing system, a printing service apparatus, an image forming apparatus, a control method, and a storage medium.

Description of the Related Art

There is provided a printing system in which a client transmits a print instruction to a server and the server receiving the print instruction provides a printing service for converting contents to be printed into print data. The concept of cloud computing has recently received attention. Like the above-mentioned system, cloud computing can also be considered as a form of a server providing a service for a client.

A major characteristic of cloud computing is that data conversion and/or data processing is performed in a distributed manner by using a large number of computing resources to simultaneously process requests from a large number of clients. Such cloud computing may be achieved in a cloud computing environment. Currently, vendors providing a wide variety of printing services and document solutions by using a plurality of web services implemented on the cloud computing environment are emerging. If the web services implemented on the cloud computing environment are updated, firmware and/or applications of printers and other devices using the web services may be updated accordingly. Various methods have been conventionally used to update the firmware and/or applications implemented in the devices.

In a first example, a distribution server that distributes firmware and/or an application notifies a user of the release of the latest firmware or application. The notified user then downloads the firmware and/or application from the distribution server and performs update.

In a second example, a distribution server that distributes firmware of a printer compares the version of the firmware stored in the own server with the version of the firmware installed in the printer. If the firmware of the printer is older, the distribution server instructs the printer to download the firmware (see Japanese Patent Application Laid-Open No. 2000-194544).

According to the conventional techniques, device vendor servers of printers and the like have provided firmware and/or applications that are appropriately usable for the devices. In recent years, more and more printing services and document solutions are provided by vendors different from those of devices that use web serves including the printing services. As a result, even if various web services are updated, the firmware and/or applications of the devices using the web services may fail to be appropriately provided.

Printers provided by various printer vendors may be registered in a printing service on such a cloud computing environment provided, for example, by Google (registered trademark). A user who uses the printing service can print a document or image by designating a registered printer. The printing service is provided by the service provider. The firmware of the printers is provided by the printer vendors. Therefore, the printer vendors foreign to the update of the web service of the printing service generate the firmware according to the update of the web service. The firmware is provided by firmware distribution servers of the printer vendors (referred to as vendor servers) different from the server of the printing service.

The printers can use an application programming interface (API) of the web service provided by the printing service to perform printer registration and printing specialized to the printing service. APIs are typically updated for the purpose of adding functions and for security measures. If the API of the printing service is updated, the following can occur. To maintain smooth service operations, the old API of the printing service cannot be immediately disused. The printing service therefore manages a plurality of versions of APIs. In terms of operational cost and security maintenance, old APIs may be disused afterward. Meanwhile, the printer vendors cannot always immediately cope with the change of the API by the printing service. Therefore, the firmware provided by the vendor servers is not necessarily able to support the latest API of the printing service. If a plurality of pieces of firmware is registered on a vendor server, the user needs to search for and download a piece of firmware that is appropriate for the printer the user uses and that corresponds to an API appropriate for the printing service.

According to the above-described techniques, a printer can download the latest firmware from a distribution server. However, if the printer uses a printing service, the printer cannot determine whether the firmware to be downloaded corresponds to an API appropriate for the printing service.

SUMMARY OF THE INVENTION

The present invention is directed to, in a system where a printer uses a printing service, a mechanism for downloading firmware that allows appropriate use of the printing service to the printer.

According to an aspect of the present invention, a printing system including a printing service apparatus configured to provide a printing service, an image forming apparatus configured to cooperate with the printing service apparatus, and a distribution server configured to distribute firmware corresponding to the printing service apparatus includes, a first determination unit configured to, when information about the image forming apparatus is registered in the printing service apparatus or when information about the image forming apparatus already registered in the printing service apparatus is updated, determine whether firmware installed in the image forming apparatus corresponds to the printing service apparatus, a second determination unit configured to, if the first determination unit determines that the firmware installed in the image forming apparatus does not correspond, determine whether firmware corresponding to the printing service apparatus exists in firmware of the image forming apparatus distributed by the distribution server, and a control unit configured to, if the second determination unit determines that the firmware corresponding to the printing service apparatus exists and when that firmware is distributed from the distribution server to the image forming apparatus, install the distributed firmware.

Further features of the present invention will become apparent from the following description of exemplary embodiments with reference to the attached drawings.

BRIEF DESCRIPTION OF THE DRAWINGS

FIG. 3 is a diagram illustrating a software configuration example of each apparatus and each server constituting the printing system.

FIGS. 4A, 4B, and 4C are diagrams illustrating data stored in an information storage unit of a printing service.

FIGS. 5A, 5B, 5C, 5D, and 5E are diagrams illustrating data stored in the information storage unit of the printing service.

FIGS. 6A, 6B, 6C, 6D, and 6E are diagrams illustrating data stored in an information storage unit of a printer.

FIG. 8 is a diagram illustrating a sequence according to a first exemplary embodiment.

FIGS. 11A and 11B illustrate examples of screens displayed on the panel of the printer.

FIG. 12 is a flowchart illustrating a second API version check.

FIG. 13 is a flowchart (first half) illustrating processing by the printer according to the first exemplary embodiment.

FIG. 14 is a flowchart (second half) illustrating the processing by the printer.

FIG. 16 is a flowchart illustrating processing by the vendor server according to the first exemplary embodiment.

FIG. 17 is a flowchart illustrating a second API version check according to a second exemplary embodiment.

FIGS. 18A, 18B, 18C, 18D, 18E, and 18F illustrate examples of printer management screens that the printing service provides for a client.

FIGS. 19A, 19B, 19C, 19D, 19E, and 19F illustrate examples of printer management screens that the printing service provides for the client.

FIG. 20 is a diagram illustrating a sequence according to a fourth exemplary embodiment.

FIG. 21 is a flowchart illustrating processing of a client according to the fourth exemplary embodiment.

FIG. 23 is a flowchart illustrating a third API version check by the printing service.

FIG. 24 is a diagram illustrating a sequence according to a ninth exemplary embodiment.

DESCRIPTION OF THE EMBODIMENTS

Figure 1:
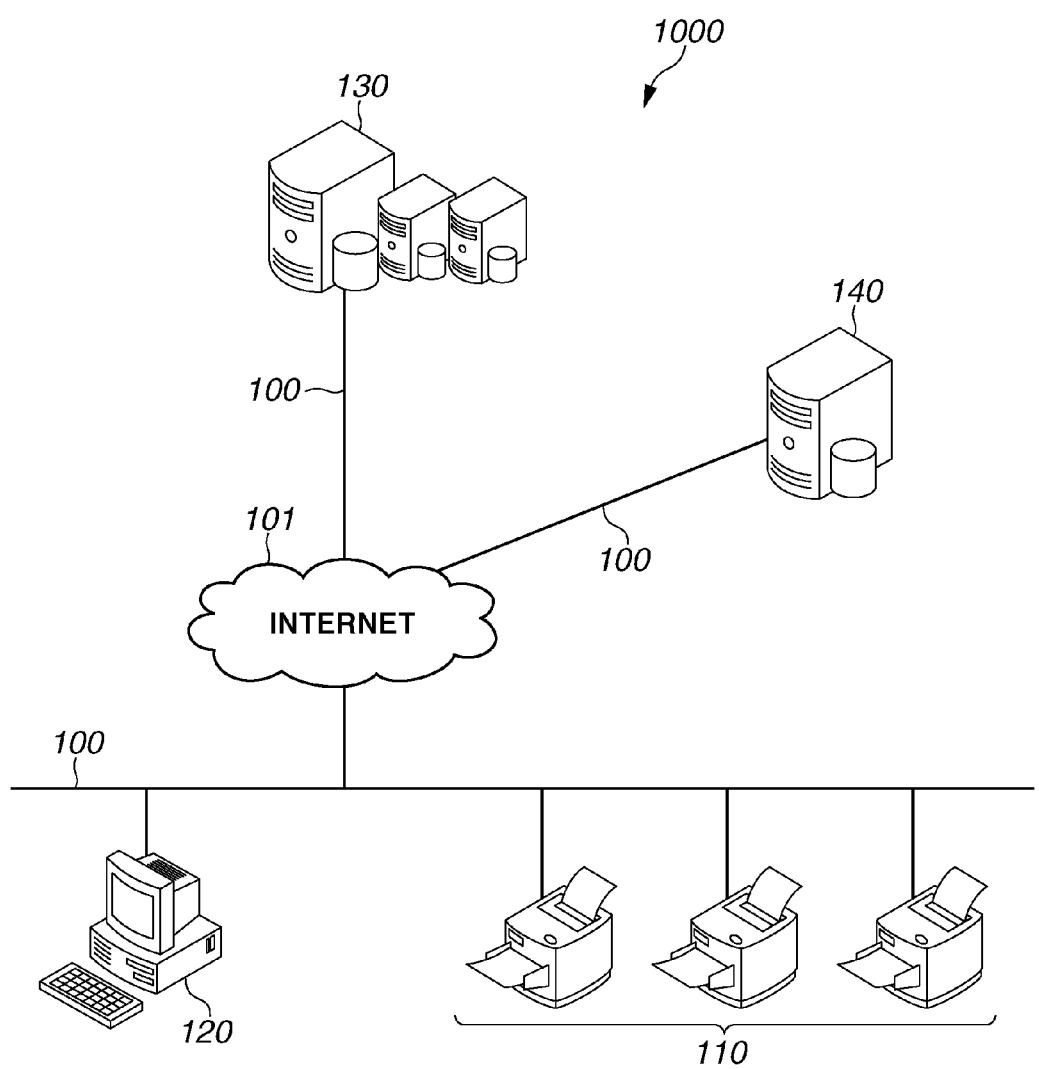
FIG. 1 is a diagram illustrating a configuration example of a printing system.

First, a configuration of a printing system 1000 according to a first exemplary embodiment will be described. FIG. 1 is a diagram illustrating a configuration example of the printing system 1000. The printing system 1000 includes a printer group 110, a client 120, a print server group 130, and a vendor site server group 140. The printer group 110 and the client 120 are apparatuses arranged in a user environment. The printer group 110 and the client 120 can be connected via a network 100, and can perform data communication with each other. The network 100 is connected to the Internet 101. The printer group 110 and the client 120 may be connected via the Internet 101. The apparatuses and the server groups constituting the printing system 1000 can be connected via the Internet 101, and can perform data communication with each other. There may be a plurality of clients 120. The printer group 110, the print server group 130, and the vendor site server group 140 may each include one or a plurality of apparatuses.

Figure 2:
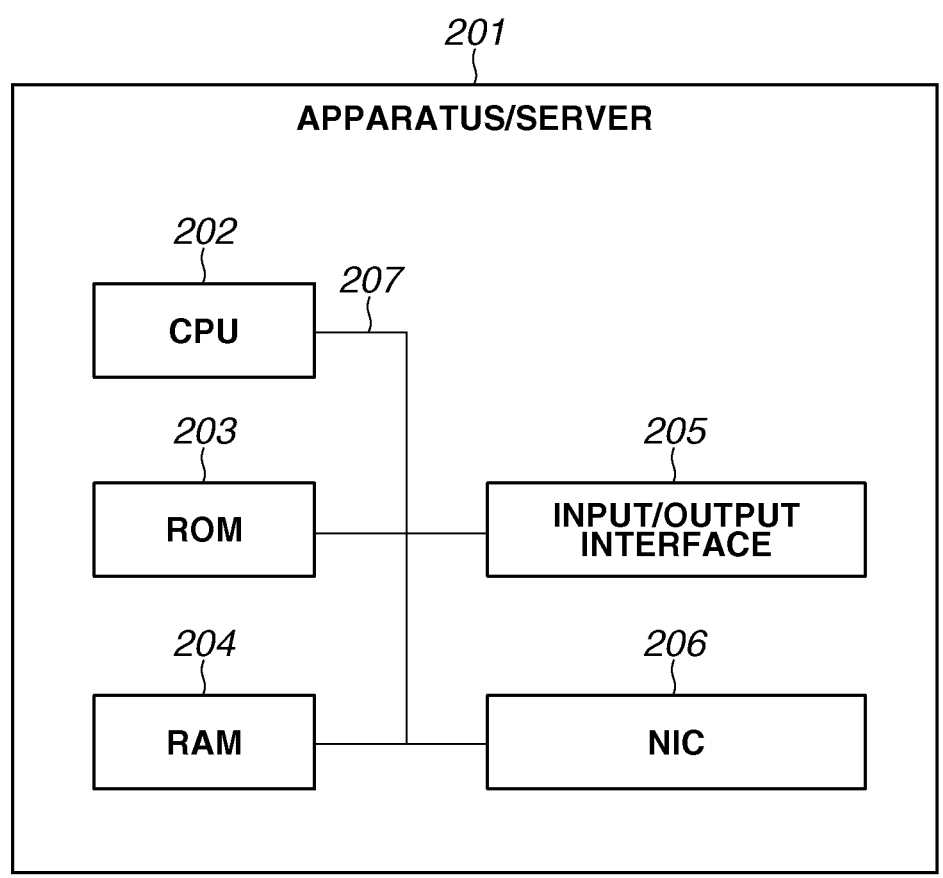
FIG. 2 is a diagram illustrating a hardware configuration example of each apparatus and each server constituting the printing system.

A hardware configuration of each apparatus and each server constituting the printing system 1000 will be described with reference to FIG. 2. Each apparatus or server 201 includes a central processing unit (CPU) 202, a read only memory (ROM) 203, a random access memory (RAM) 204, an input/output interface 205, and a network interface card (NIC) 206. The CPU 202 is a unit that executes various programs and implements various functions. The ROM 203 is a unit that stores various programs. The RAM 204 is a unit that may be used as a temporary work storage area of the CPU 202. The CPU 202 loads the programs stored in the ROM 203 into the RAM 204 and executes the programs to implement functions of each apparatus or unit.

The input/output interface 205 is an interface unit that transmits data to a display (not illustrated) connected to the apparatus or server 201 and receives data from a pointing device or the like (not illustrated). The NIC 206 is a unit for connecting each apparatus or server 201 constituting the printing system 1000 to the network 100.

The units describe above can transmit and receive data via a bus 207. Each print control unit included in the printer group 110 includes a print unit (not illustrated). The print unit can transmit and receive data to/from the units via the bus 207. The print unit is a unit that can print a raster image on a recording medium.

A software configuration of each apparatus and each server constituting the printing system 1000 will be described with reference to FIG. 3. Programs for implementing the functions of the software configuration illustrated in FIG. 3 are stored in the ROM 203 of the respective apparatuses or servers 201. The CPU 202 loads the programs into the RAM 204 and executes the programs to implement such functions.

The print server group 130 includes a plurality of servers which is regarded as a single virtualized server. The single server serves as a printing service apparatus which implements functions of a printing service 330. The print server group 130 runs a plurality of virtual machines in the single server, and causes each of the virtual machines to provide the functions of a printing service 330. FIG. 3 illustrates one of the printing services 330.

For example, the printing service 330 provides a cloud printing service. The printing service 330 includes a web application 331, a service control unit 332, a printer management unit 333, an information storage unit 334, a user management unit 335, a mail management unit 336, and a print management unit 337. The web application 331 accepts various requests from a web browser 320 and provides the web browser 320 with a log-in screen and a printer management screen of the printing service 330. The web application 331 also has the functions of a web server. The service control unit 332 controls APIs that the printing service 330 provides. The service control unit 332 controls cooperation of the units constituting the printing service 330, whereby the printing service 330 is implemented. The printer management unit 333 manages registration and deletion of the printer group 110 that uses the printing service 330. The information storage unit 334 is a database that stores information about registered printers and users. The user management unit 335 manages information about users who use the printing service 330. The mail management unit 336 transmits a mail to a mail client 321. The print management unit 337 manages generation of a print job in response to a print instruction from the web browser 320 and transmission of the print job to a designated printer.

The client 120 is a user apparatus which includes the web browser 320 and the mail client 321 and is used by a user. The web browser 320 communicates with the web application 331 of the print server group 130 to obtain the log-in screen and the printer management screen of the printing service 330, and implements various operations. The mail client 321 is software for implementing transmission and reception of electronic mails. The mail client 321 receives a mail notification from the print server group 130.

The printer group 110 is an image forming apparatus that performs printing by using the printing service 330. The printer group 110 can obtain firmware from the vendor site server group 140 and install the firmware. Each printer included in the printer group 110 includes a printer registration unit 310, an information storage unit 311, a firmware management unit 312, a print control unit 313, and an operation unit 314. The printer registration unit 310 registers and updates printer information in the printing service 330, and obtains version information about the APIs provided by the printing service 330. The information storage unit 331 is a database that stores management information about the printer, information for using the printing service 330, and management information about the firmware. The firmware management unit 312 manages firmware information used by the printer and performs control for firmware update. The firmware management unit 312 also controls communication with the vendor site server group 140 to obtain firmware. The print control unit 313 controls processing for printing print data received from the printing service 330. The operation unit 314 includes a panel and an operation button of the printer. In the following description of exemplary embodiments, the printers of the printer group 110 may be referred to as printers 110.

The vendor site server group 140 (hereinafter, referred to as a vendor server 140) is a distribution server that implements an information provision site managed by a printer vendor. The printer server 140 implements the information provision site and provides printer product information and firmware information via the Internet 101. The vendor server 140 includes a web application 340, a firmware management unit 341, and an information storage unit 342. The web application 340 controls communication from the printers of the printer group 110 and the client 120, and transmits product information and firmware information. The firmware management unit 341 provides stored firmware and firmware information in response to a firmware acquisition request from a printer of the printer group 110 and/or the client 120 via the web application 340. The firmware information is information including resource information. The information storage unit 342 is a database that stores the firmware, the firmware information, and contents that the vendor server 140 provides.

User information is initially registered in the printing service 330 according to the present exemplary embodiment. A printer or printers is/are then registered as linked with the user information. The user information and printer information registered in the printing service 330 are stored in the information storage unit 334. FIGS. 4A, 4B, and 4C are diagrams illustrating data stored in the information storage unit 334. The information storage unit 334 stores the data illustrated by way of example in FIGS. 4A, 4B, and 4C.

FIG. 4A illustrates data on user information about users who use the printing service 330. The data on the user information includes a user account 401, a password 402, and a notification destination mail address 403. The user account 401 is user identification information that a user uses when using the printing service 330. The password 402 is password information corresponding to the user account 401. When the user uses the printing service 330, the user logs on to the printing service 330 by using the user account 401 and the password 402. The notification destination mail address 403 is a mail address for the printing service 330 to use when making a notification to the user.

FIG. 4B illustrates data on the printer information registered in the printing service 330. The data on the printer information includes a printer name 411, a printer identifier (ID) 412, an Internet Protocol (IP) address 413, a printer model name 414, a firmware version 415, an API version 416, a vendor universal resource locator (URL) 417, and an administrator user account 418. The printer name 411 is the name of a printer registered in the printing service 330. The printer name 411 is used when referring to the printer. Unlike identification information, different printers may have the same printer name. The printer ID 412 is printer identification information with which the printing service 330 uniquely identifies the printer. The printer ID 412 may be an arbitrary printer ID that can uniquely identify the printer. Examples include a universally unique identifier (UUID) and a media access control (MAC) address. The IP address 413 is information indicating the address (addressing) of the printer on the network. The printer model name 414 is a name expressing the model of the printer.

The firmware version 415 is version information about the firmware installed in the printer. The API version 416 is the version of an API of the printing service 330 to which the firmware installed in the printer is applicable. The vendor URL 417 is the URL of the vendor server 140 of the printer vendor linked with the printer. The printing service 330 can obtain the vendor URL from the printer and access the vendor server 140 to obtain various types of information. The administrator user account 418 is a user account that is registered in the printing service 330 as an administrator of the printer.

FIG. 4C illustrates data on version information about the APIs that the printing service 330 provides. The version information about the APIs of the printing service 330 is managed as a service API list 421. The printing service 330 manages a plurality of versions of APIs to maintain smooth service operations. Data illustrated in FIGS. 5A, 5B, 5C, 5D, and 5E will be described below.

FIGS. 6A, 6B, 6C, 6D, and 6E illustrate data stored in the information storage unit 311 of a printer 110. The printers of the printer group 110 using the printing service 330 according to the present exemplary embodiment each store the data illustrated by way of example in FIGS. 6A, 6B, 6C, 6D, and 6E in their information storage unit 311. FIG. 6A illustrates data on management information of the printer 110. The data includes a printer name 501, a printer ID 502, an IP address 503, a printer model name 504, and a vendor URL 505. The data illustrated in FIG. 6A is information that the printer 110 passes to the printing service 330 when the printer 110 is registered in the printing service 330. The printer name 501, the printer ID 502, the IP address 503, the printer model name 504, and the vendor UL 505 are similar to the printer name 411, the printer ID 412, the IP address 413, the printer model name 414, and the vendor URL 417 illustrated in FIG. 4B.

FIG. 6B illustrates data that is used when the printer 110 uses a service. In the present exemplary embodiment, the printer 110 requests the printing service 330 to register the printer 110, and obtains the data illustrated in FIG. 6B from the printing service 330. The data illustrated in FIG. 6B includes a service name 511, a service URL 512, and a service API version 513. The service name 511 is the name of the service usable by the printer 110. In the present exemplary embodiment, the service name 511 is the printing service. The service URL 512 is the URL to be accessed when the printer 110 uses the service. The service API version 513 is information about the APIs provided by the service. The service API version 513 stores the versions of the usable APIs. The service API version 513 is data on the service API list 421 that the printer 110 receives from the printing service 330. There may be a plurality of service API versions 513.

FIG. 6C illustrates data on firmware information of the printer 110. The data on the firmware information includes a printer model name 521, a firmware version 522, a usable service name 523, and a corresponding service API version 524. The data on the firmware information further includes an appropriate firmware version 525, a usable service name of appropriate firmware 526, and a corresponding service API version of appropriate firmware 527. The printer model name 521 is similar to the printer model name 504. The firmware version 522 is the version of the firmware installed in the printer 110. The firmware version 522 is similar to the firmware version 415 illustrated in FIG. 4B, managed by the printing service 330. The usable service name 523 is the name of the service usable by the firmware installed in the printer 110. The usable service name 523 is similar to the service name 511 illustrated in FIG. 6B. The corresponding service API version 524 is the version of the API of the service usable by the firmware installed in the printer 110. The corresponding service API version 524 is similar to the API version 416 illustrated in FIG. 4B.

The appropriate firmware version 525, the usable service name of appropriate firmware 526, and the corresponding service API version of appropriate firmware 527 illustrated in FIG. 6C are data stored after the printer 110 obtains the information about the firmware from the vendor server 140. Specifically, such data is registered after a second API version check to be described below. The appropriate firmware version 525 is version information about a piece of firmware that can appropriately correspond to an API provided by the printing service 330 among the pieces of firmware registered on the vendor server 140. There may be a plurality of appropriate firmware versions 525. The usable service name of appropriate firmware 526 is the name of the service that includes the API appropriately usable by the firmware of the appropriate firmware version 525. There may be more than one usable service name of appropriate firmware 526 for one appropriate firmware version 525. The corresponding service API version of appropriate firmware 527 is the version of the API to which the firmware of the appropriate firmware version 525 corresponds among the APIs that the service of the usable service name of appropriate firmware 526 provides.

FIG. 6D illustrates data on results of API version checks performed by the printer 110. The data on the results of the API version checks includes a service name 531, a first API version check 532, and a second API version check 533. The service name 531 is the name of the service that provides the APIs. The service name 531 is similar to the service name 511 illustrated in FIG. 6B. The first API version check 532 is result information about a first API version check. Either true or false is registered as the result information. If the API of the printing service 330 to which the firmware installed in the printer 110 corresponds is an appropriate API provided by the printing service 330, true is registered. If the API is not an appropriate one, false is registered.

The second API version check 533 is result information about a second API version check. If the API of the printing service 330 to which the firmware registered on the vendor server 140 corresponds is an appropriate API provided by the printing service 330, true is registered. If the API is not an appropriate one, false is registered. The first and second API version checks will be described in detail with reference to FIGS. 8, 9, and 10. The information storage unit 311 of the printer 110 also stores other data such as the number of sheets printed and an operation log. Since such data is not an essential component of the present invention, a description thereof will be omitted.

FIG. 6E illustrates correspondence information about the firmware registered on the vendor server 140 and the API versions of a service. The correspondence information may include information about firmware that is inappropriate for the printer 110 to use various services. A printer model name 541 is similar to the printer model name 504 illustrated in FIG. 6A. A firmware version 542 is the version of firmware intended for the printer 110 having the printer model name 541, registered on the vendor server 140. A corresponding API version 543 is the version of the API of a service to which the firmware registered on the vendor server 140 corresponds. The information storage unit 311 of the printer 110 stores such correspondence information for each service.

Figure 7A:
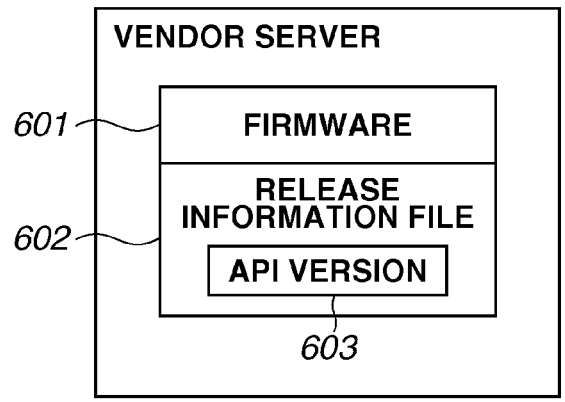
FIGS. 7A, 7B, and 7C are diagrams illustrating data stored in an information storage unit of a vendor server.
Figure 7B:
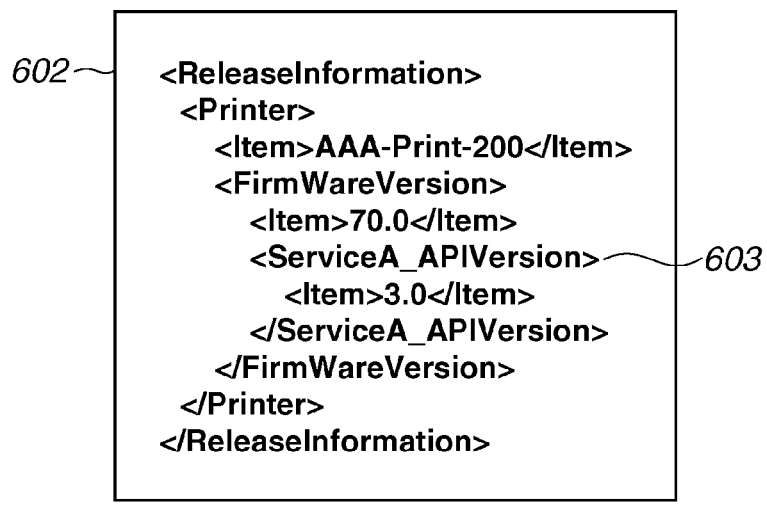
Figure 7C:
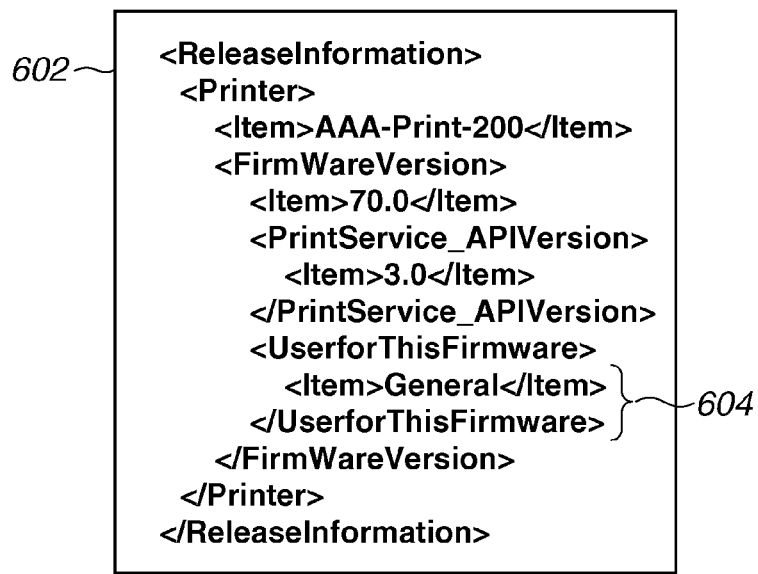

FIGS. 7A, 7B, and 7C illustrate data stored in the information storage unit 342 of the vendor server 140. To enable downloading of firmware by the printers of the printer group 110, the vendor server 140 according to the present exemplary embodiment stores the data illustrated by way of example in FIGS. 7A, 7B, and 7C in the information storage unit 342.

FIG. 7A illustrates data on firmware that the vendor server 140 provides. The data includes firmware 601 and a release information file 602. The firmware 601 is the entity of the firmware. The printers of the printer group 110 download and use the firmware 601. The release information file 602 is a file into which information about the firmware released from the vendor server 140 is summarized. The file includes an API version (for example, 603) provided by various services and correspondence information describing a firmware version corresponding to the API version.

FIG. 7B illustrates the release information file 602. The release information file 602 describes information about a printer model name to which the firmware corresponds, a firmware version, the service name of a service of which an API is usable, and the API version 603 of the usable service. A release information file 602 may be provided for each piece of firmware. A release information file 602 may be provided in a format in which a plurality of pieces of firmware information is written.

FIG. 7C illustrates another example of the release information file 602. The release information file 602 includes identification information 604 for determining whether the firmware is firmware intended for a special purpose or standard firmware intended for general purposes, aside from the information included in the release information file 602 described in FIG. 7B. In FIG. 7C, the release information file 602 includes a character string "General" as the identification information 604, indicating that the firmware is standard firmware intended for general purposes. If the firmware is firmware intended for a special purpose, a character string "Special" is written as the identification information 604.

Next, processing to be performed when a printer 110 registers itself as a new printer in the printing service 330 will be described with reference to FIG. 8. In the first exemplary embodiment, the printer 110 takes the initiative. For new registration, the printer 110 determines whether its firmware does not correspond to an appropriate API, examines firmware registered on the vendor server 140, and identifies and downloads appropriate firmware. The CPU 202 of each apparatus or server 201 loads a program stored in the ROM 203 into the RAM 204 and executes the program, whereby the processing illustrated in FIG. 8 is implemented. Suppose that the administrator of the printer 110 has registered the administrator's administrator user account 418 as a user of a printing service 330 in advance. Suppose also that the administrator has obtained a registration ticket to the printing service 330 linked with the administrator user account 418 in advance.

In step S1001, the printer 110 connects to the printing service 330 by using the service URL 512 (FIG. 6B). In step S1002, the printing service 330 permits the connection of the printer 110. In step S1003, the printer 110 requests the printing service 330 to register the printer 110 by using the registration ticket. Here, the printer 110 obtains registration information from the information storage unit 311, and transmits the registration information to the web application 331 of the printing service 330 via the printer registration unit 310. The registration information includes a printer name 501, a printer ID 502, an IP address 503, a printer model name 504, a vendor URL 505, a firmware version 522, and a corresponding service API version 524.

In step S1004, the printing service 330 receives the registration information from the printer 110 via the web application 331. The printing service 330 stores the registration information in the information storage unit 334 (FIG. 4B) under instructions from the service control unit 332. Here, the printing service 330 links the received registration information with the administrator user account 418 by using the registration ticket. In step S1005, the printing service 330 obtains the service API list 421 (FIG. 4C) stored in the information storage unit 334. In step S1006, the printing service 330 transmits the service API list 421 to the printer 110.

The printer 110 receives the service API list 421 from the printing service 330 via the printer registration unit 310, and stores the service API list 421 in the information storage unit 311. The data is stored as the service API version 513 of FIG. 6B. In step S1007, the printer 110 performs the first API version check as a first determination. In the first API version check, the printer 110 compares the API version of the service usable by the firmware currently installed in the printer 110 with the API versions provided by the printing service 330, and determines whether the printer 110 is using an appropriate API. If the printer 110 is determined to be using an appropriate API of the printing service 330, the processing proceeds to step S1016. The first API version check will be described in detail below with reference to FIG. 9. If the printer 110 is determined not to be using an appropriate API of the printing service 330, then in step S1008, the printer 110 displays a firmware check instruction screen on the panel of the operation unit 314.

In step S1009, the printer 110 accesses the vendor server 140 and inquires registered firmware information. To enable the access to the vendor server 140 by the printer 110, the firmware management unit 312 uses the vendor URL 505 (FIG. 6A). The vendor server 140 stores the firmware 601 and the release information file 602 including the information about the API version 603 illustrated in FIG. 7A. In step S1010, the vendor server 140 obtains the release information file 602 illustrated in FIG. 7B from the firmware management unit 341 and transmits the release information file 602 to the printer 110. The printer 110 receives the release information file 602 and stores the data as illustrated in FIG. 6E.

In step S1011, the printer 110 performs the second API version check as a second determination. The printer 110 extracts the information about the printer model name 541, the firmware version 542, and the corresponding API version 543 illustrated in the correspondence information (FIG. 6E) with respect to each usable service. In the second API version check, the printer 110 compares the versions of the APIs provided by the printing service 330 with the API versions of the services to which the firmware released by the vendor server 140 corresponds. By such a comparison, the printer 110 checks whether the firmware on the vendor server 140 can use an API appropriate for the service. If the printer 110 obtains information about N pieces of firmware from the vendor sever 140, the printer 110 performs the second API version check on the N pieces. The second API version check will be described in detail below with reference to FIG. 12.

In step S1012, the printer 110 displays a firmware update confirmation screen on the panel of the operation unit 314 according to the result of determination in step S1011. In step S1013, if the user requests firmware update via the firmware update confirmation screen, the printer 110 designates selected firmware and requests the vendor server 140 to obtain the firmware. In step S1014, the vendor server 140 transmits the requested firmware to the printer 110.

In step S1015, the printer 110 receives and updates the firmware. After the completion of the update, the printer 110 updates the appropriate firmware version 525, the usable service name of appropriate firmware 526, and the corresponding service API version of appropriate firmware 527 illustrated in FIG. 6C. In step S1016, the printer 110 notifies the printing service 330 of the latest printer information. The printer information to be notified includes information about the appropriate firmware version 525, the usable service name of appropriate firmware 526, and the corresponding service API version of appropriate firmware 527. If the firmware has not been updated, the printer 110 does not need to notify such information. In step S1017, the printing service 330 stores the printer information received from the printer 110 into the information storage unit 334 (FIG. 4B) under instructions from the service control unit 332. In step S1018, the printing service 330 notifies the printer 110 of the completion of the registration of the received printer information. This ends the sequence of FIG. 8. The printing service 330 may notify the mail client 321 of the latest printer registration information by using the mail management unit 336.

Figure 9:
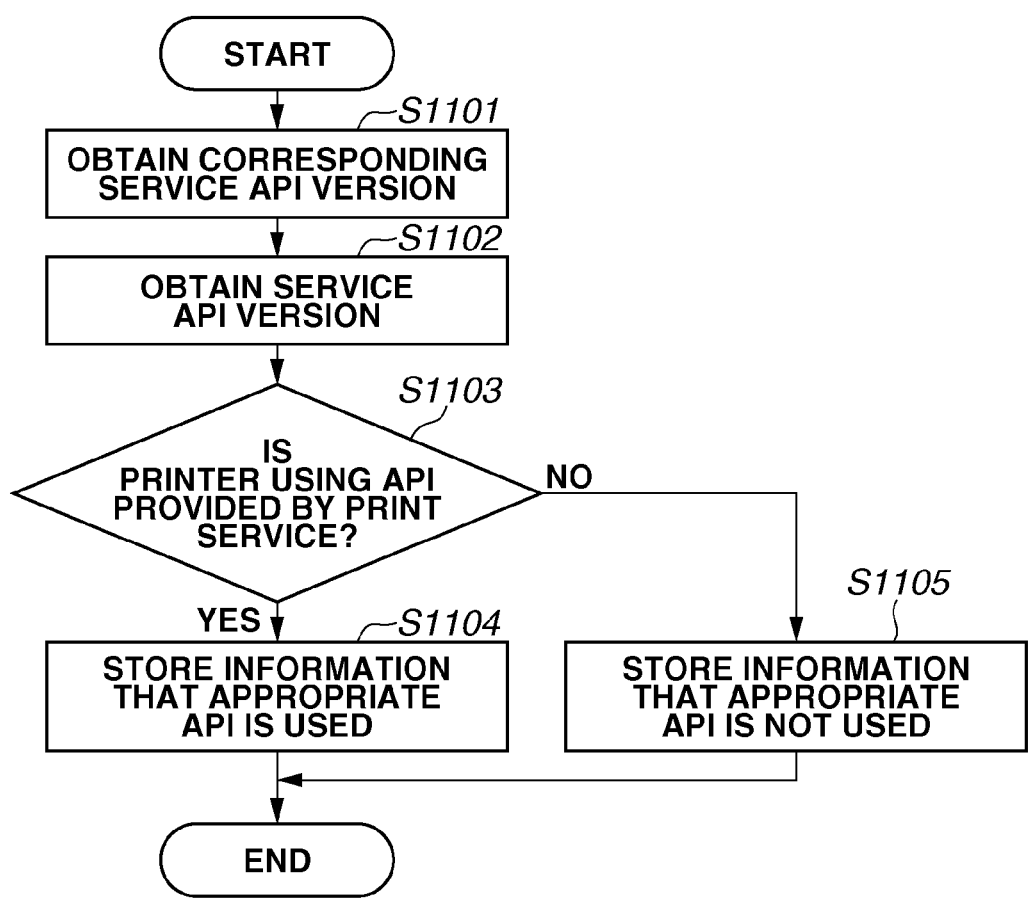
FIG. 9 is a flowchart illustrating a first API version check.

FIG. 9 illustrates a flow of the first API version check in the processing of step S1007 in FIG. 8. In step S1101, the firmware management unit 312 of the printer 110 obtains the corresponding service API version 524 illustrated in FIG. 6C. Here, the firmware management unit 312 obtains the API version (2.0) of the printing service 330 to which the current firmware corresponds. In step S1102, the firmware management unit 312 obtains the service API version 513 illustrated in FIG. 6B. Here, the firmware management unit 312 obtains the API versions (2.8, 2.9, and 3.0) transmitted from the printing service 330.

In step S1103, the firmware management unit 312 determines whether the printer 110 is using an API provided by the printing service 330. In the present exemplary embodiment, the firmware management unit 312 compares the API version (2.0) with the versions (2.8, 2.9, and 3.0) of the APIs and determines that the printer 110 is not using an appropriate version of API (NO in step S1103). The processing thus proceeds to step S1105. In step S1103, if the printer 110 is determined to be using an appropriate API (YES in step S1103), the processing proceeds to step S1104. In step S1104, the firmware management unit 312 stores information that "an appropriate API is used" (true) in the first API version check 532 illustrated in FIG. 6D. In step S1105, the firmware management unit 312 stores information that "an appropriate API is not used" (false) in the first API version check 532 illustrated in FIG. 6D. After the completion of the processing of step S1104 or S1105, the printer 110 ends the processing.

Figure 10A:
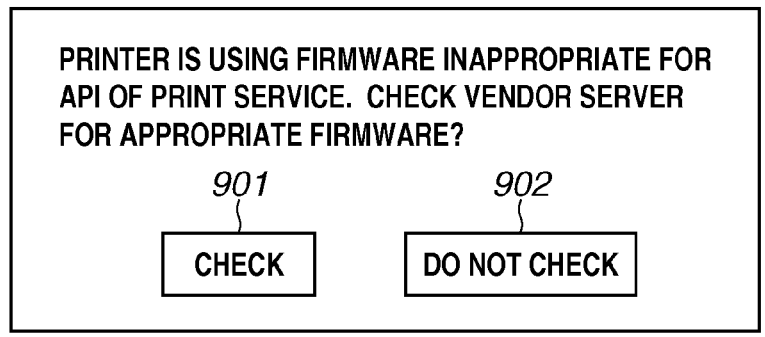
FIGS. 10A, 10B, 10C, and 10D illustrate examples of screens displayed on a panel of the printer.

FIG. 10A illustrates the firmware check instruction screen that the printer 110 displays on the panel in the processing of step S1008. If the printer 110 is determined not to be using an appropriate API of the printing service 330, the printer 110 displays the firmware check instruction screen illustrated in FIG. 10A to prompt the user to check the firmware registered on the vendor server 140. The firmware check instruction screen illustrated in FIG. 10A displays a message to the user, a check button 901 for giving an instruction to check, and a check suspension button 902 for giving an instruction not to check. If the user presses the check button 901, the firmware management unit 312 of the printer 110 obtains the release information file 602 from the vendor server 140. If the user presses the check suspension button 902, the printer 110 performs the processing of step S1016.

FIG. 12 illustrates a flow of the second API version check in the processing of step S1011 in FIG. 8. The printer 110 performs the following second API version check by using the correspondence information illustrated in FIG. 6E, obtained and stored from the vendor sever 140. The printer 110 stores information determined to be appropriate to use various services into the appropriate firmware version 525, the usable service name of appropriate firmware 526, and the corresponding service API version of appropriate firmware 527 illustrated in FIG. 6C.

Upon starting the processing of the flow illustrated in FIG. 12, in step S1201, the firmware management unit 312 of the printer 110 obtains the service API version 513 illustrated in FIG. 6B. Here, the firmware management unit 312 obtains the API versions (2.8, 2.9, and 3.0) transmitted from the printing service 330 in step S1006. In step S1202, the printer 110 obtains the correspondence information illustrated in FIG. 6E.

In step S1203, the firmware management unit 312 determines whether the firmware registered on the vendor server 140 corresponds to an API of the printing service 330. In the present exemplary embodiment, the firmware management unit 312 extracts records in which the corresponding API version 543 includes an API version (2.8, 2.9, or 3.0). The corresponding API version 543 of V3.0 coincides with an API version supported by the printing service 330. Here, the firmware management unit 312 extracts the records including the firmware version 542 of V70.1 and V70.0. The firmware management unit 312 then compares the extracted firmware versions (V70.1 and V70.0) with the firmware version 522 (60.0) illustrated in FIG. 6C. In the present exemplary embodiment, the extracted firmware versions do not coincide with the firmware version 522. In step S1203, the firmware management unit 312 therefore determines that the firmware does not correspond to the APIs (NO in step S1203), and the processing proceeds to step S1205.

In step S1203, if the firmware released from the vendor server 140 is determined to correspond to an API provided by the printing service 330 (YES in step S1203), the processing proceeds to step S1204. In step S1204, the firmware management unit 312 stores the appropriate firmware version 525, the usable service name of appropriate firmware 526, and the corresponding service API version of appropriate firmware 527 as illustrated in FIG. 6C. Since there is a plurality of firmware versions, the firmware management unit 312 stores the latest firmware version (70.1). The firmware management unit 312 further stores information that "the firmware on the vendor server can use an appropriate API" (true) in the second API version check 533 illustrated in FIG. 6D. In step S1205, the firmware management unit 312 stores information that "the firmware on the vendor server cannot use an appropriate API" (false) in the second API version check 533 illustrated in FIG. 6D. After the completion of the processing of step S1204 or S1205, the printer 110 ends the processing.

Figure 10B:
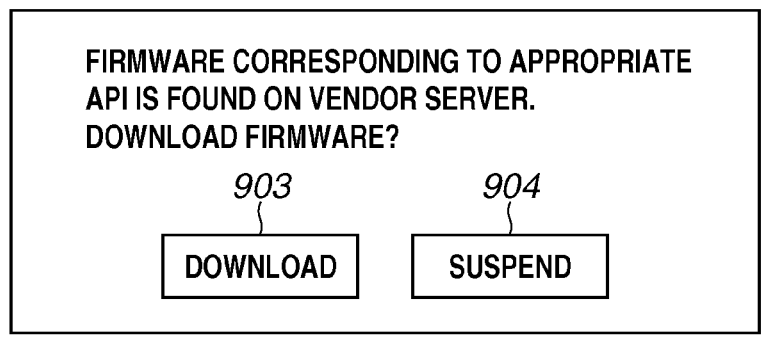
Figure 10C:
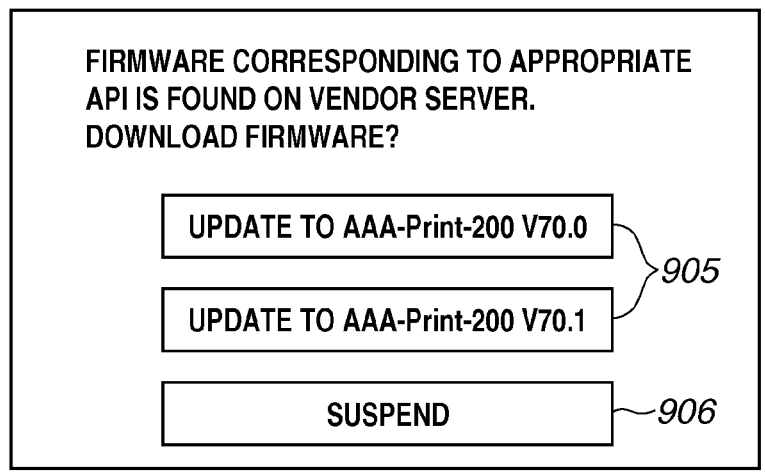
Figure 10D:
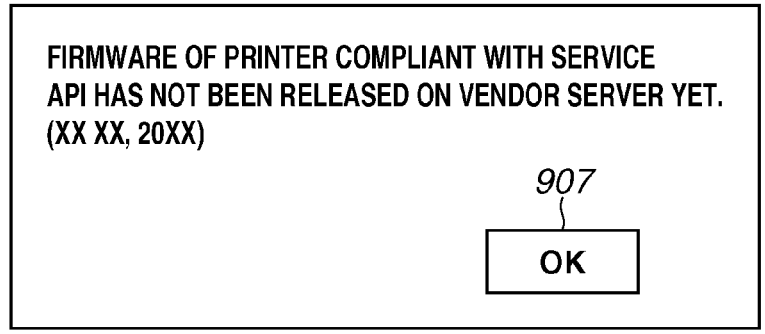

FIGS. 10B, 10C, and 10D illustrate firmware update confirmation screens that the printer 110 displays on the panel in the processing of step S1012. The printer 110 displays a firmware update confirmation screen (FIG. 10B, 10C, or 10D) on the panel of the operation unit 314 according to the determination result of the second API version check in step S1011. If the determination result is true, the printer 110 displays the firmware update confirmation screen of FIG. 10B. The firmware update confirmation screen of FIG. 10B displays a message that firmware corresponding to an appropriate API can be downloaded from the vendor server, as well as an update button 903 and a suspension button 904.

If the user presses the update button 903, the printer 110 obtains the latest firmware (V70.1) among the extracted firmware versions from the vendor server 140. If the user presses the suspension button 904, the printer 110 notifies the printing service 330 of the API version (V2.0) of the currently-installed firmware. Alternatively, if there is a plurality of extracted firmware versions, the printer 110 may display a selection screen in which the plurality of firmware versions to be installed is listed as illustrated in FIG. 10C so that the user can select the firmware version to download. In such a case, the printer 110 further stores data about the firmware version 70.0 as the data illustrated in FIG. 6C.

The firmware update confirmation screen illustrated in FIG. 10C includes update buttons 905 and a suspension button 906. The user can specifically designate the piece of firmware to download by using the update buttons 905. If the user presses an update button 905, the printer 110 downloads the selected piece of firmware from the vendor server 140. The suspension button 906 is similar to the suspension button 904 of FIG. 10B.

If, in the second API version check, the printer 110 determines that "the firmware on the vendor server cannot use an appropriate API," the printer 110 displays the firmware update confirmation screen of FIG. 10D. The printer 110 displays the firmware update confirmation screen illustrated in FIG. 10D to notify the user that firmware appropriate for the APIs of the printing service 330 has not been registered on the vendor server 140. The firmware update confirmation screen illustrated in FIG. 10D may further display a notification date and/or a scheduled date of update of firmware on the vendor server 140. The firmware update confirmation screen illustrated in FIG. 10D includes an OK button 907. If the user presses the OK button 907, the printer 110 displays an initial screen (not illustrated).

FIGS. 13 and 14 are flowcharts illustrating processing performed by the printer 110 according to the first exemplary embodiment. Upon starting the processing, in step S1301 of FIG. 13, the printer 110 issues a connection request to the web application 331 of the printing service 330 via the printer registration unit 310. The printer 110 accesses the printing service 330 by using the service URL 512 illustrated in FIG. 6B, stored in the information storage unit 311. In step S1302, the printer 110 receives connection permission from the printing service 330. In step S1303, the printer 110 requests the printing service 330 to register the printer 110. Here, the printer 110 transmits the data illustrated in FIG. 6A and the data of the printer model name 521, the firmware version 522, the usable service name 523, and the corresponding service API version 524 illustrated in FIG. 6C. In step S1304, the printer 110 obtains information about the API versions with which the printing service 330 can be used from the printing service 330. More specifically, the printer 110 obtains the data illustrated in FIG. 6B and stores the data in the information storage unit 311.

In step S1305, the printer 110 performs the first API version check described in FIG. 9 by the processing of the firmware management unit 312. In step S1306, the printer 110 determines whether an API of the printing service 330 is appropriately usable by using the API to which the currently-installed firmware corresponds. If an API of the printing service 330 is determined to be usable (appropriate) (YES in step S1306), the processing of the printer 110 proceeds to step S1321. If the APIs of the printing service 330 are determined to be unusable (inappropriate) (NO in step S1306), the processing of the printer 110 proceeds to step S1307. In step S1307, the printer 110 displays the firmware check instruction screen illustrated in FIG. 10A on the panel of the operation unit 314. In step S1308, the user makes a panel operation to press a button, and the printer 110 detects the user's instruction. In step S1309, based on instruction information detected in step S1308, the printer 110 determines whether to check the firmware registered on the vendor server 140. If the user's instruction is not to check (NO in step S1309), the processing proceeds to step S1321. If the user's instruction is to check (YES in step S1309), the processing proceeds to step S1310.

In step S1310 of FIG. 14, the printer 110 requests the correspondence information about the firmware registered on the vendor server 140 and the API versions of the printing service 330 to which the registered firmware corresponds by using the vendor URL 505 (FIG. 6A). The printer 110 thereby obtains the release information file 602 from the vendor server 140. In step S1311, the printer 110 extracts the stored correspondence information illustrated in FIG. 6E. In step S1312, the printer 110 performs the second API version check described in FIG. 12 by the processing of the firmware management unit 312.

In step S1313, the printer 110 determines whether firmware (appropriate firmware) corresponding to an API version with which the printing service 330 can be used is registered on the vendor server 140. If appropriate firmware is determined not to be registered (NO in step S1313), the processing proceeds to step S1320. In step S1320, the printer 110 displays that there is no appropriate firmware on the vendor server 140 (FIG. 10D). After the processing of step S1320, the printer 110 performs the processing of step S1321. In step S1313, if appropriate firmware is determined to be registered (YES in step S1313), then in step S1314, the printer 110 displays the firmware update confirmation screen illustrated by way of example in FIG. 10B or 10C on the panel of the operation unit 314. The printer 110 stores the information about the appropriate firmware into the columns of items 525 to 527 in FIG. 6C.

In step S1315, the user gives an instruction by a panel operation, and the printer 110 detects the user's instruction. In step S1316, based on the information about the detected user's instruction, the printer 110 determines whether to update the firmware of the printer 110. If the firmware is not to be updated (NO in step S1316), the printer 110 performs the processing of step S1321. If the firmware is to be updated (YES in step S1316), then in step S1317, the printer 110 requests firmware from the vendor server 140. If the firmware check confirmation screen illustrated in FIG. 10B is displayed on the panel, the printer 110 requests the latest firmware. If the firmware check confirmation screen illustrated in FIG. 10C is displayed, the printer 110 requests the selected firmware. In step S1318, the printer 110 downloads the firmware to be obtained from the vendor server 140.

In step S1319, the printer 110 updates its firmware by using the obtained firmware. In step S1321, the printer 110 transmits the latest printer information to the printing service 330. The printer information includes the data illustrated in FIG. 6A and the data of the items 521 to 524 in FIG. 6C. In step S1322, the printer 110 receives a registration completion notification from the printing service 330, and ends the processing.

Figure 15:
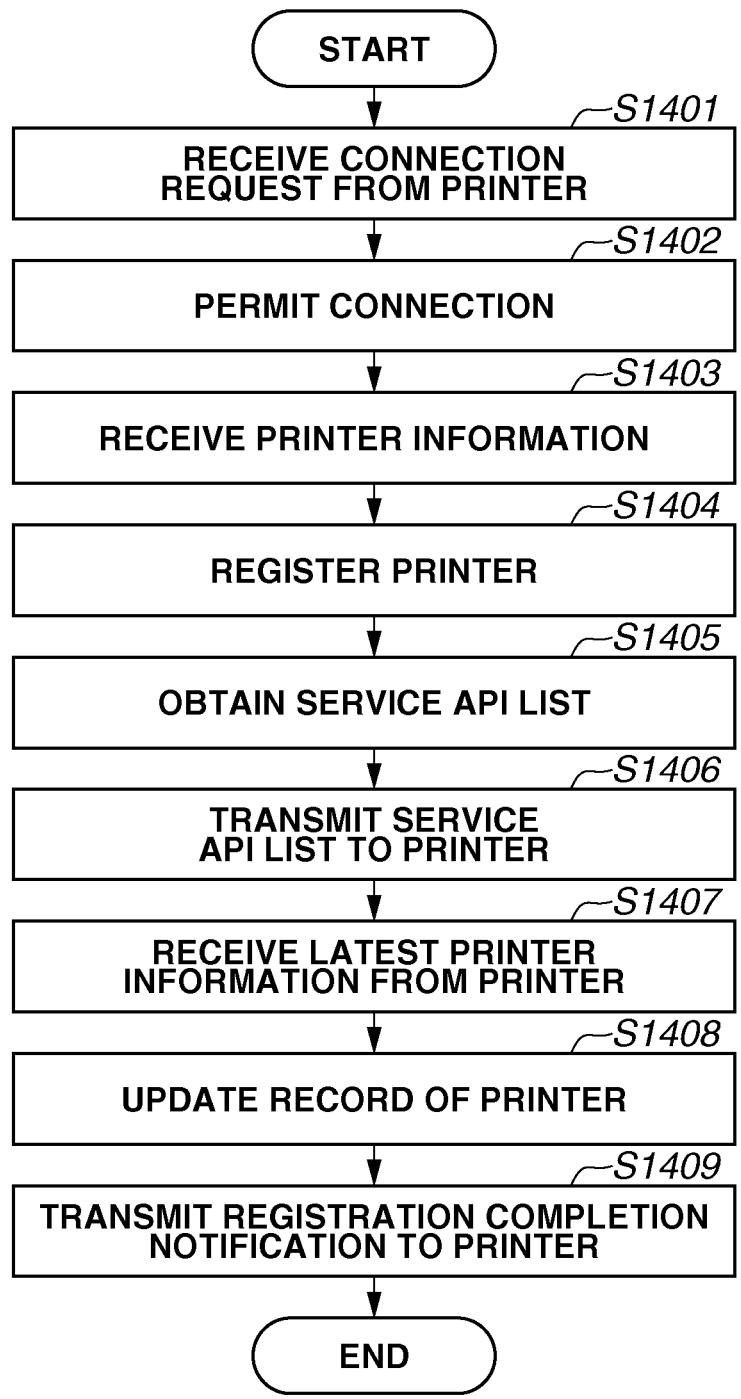
FIG. 15 is a flowchart illustrating processing by the printing service according to the first exemplary embodiment.

FIG. 15 is a flowchart illustrating processing performed by the printing service 330 according to the first exemplary embodiment. Upon starting the processing, in step S1401, the printing service 330 receives a connection request from a printer 110 via the web application 331. In step S1402, the printing service 330 permits the connection. In step S1403, the printing service 330 receives printer information from the printer 110. In step S1404, the printing service 330 checks the received printer information and the data of the information storage unit 334 illustrated in FIG. 4B, and registers the printer 110. In step S1405, the printing service 330 obtains the service API list 421 (FIG. 4C) from the information storage unit 334. In step S1406, the printing service 330 transmits the service API list 421 to the printer 110.

In step S1407, the printing service 330 receives the latest printer information from the printer 110. Here, the printing service 330 receives the data of the items 525 to 527 in FIG. 6C. In step S1408, the printing service 330 updates the record of the printer illustrated in FIG. 4B corresponding to the received printer by using the obtained latest printer information. In step S1409, the printing service 330 transmits a notification completion notification to the printer 110, and ends the processing.

FIG. 16 is a flowchart illustrating processing performed by the vendor server 140 according to the first exemplary embodiment. Upon starting the processing, in step S1501, the vendor server 140 receives a request for the correspondence information about the registered firmware and the API versions of a service from the printer 110 by the processing of the web application 340. In step S1502, the vendor server 140 obtains the release information file 602 from the information processing unit 342 by the processing of the firmware management unit 341. In step S1503, the vendor server 140 transmits the release information file 602 to the printer 110.

In step S1504, the vendor server 140 receives a firmware acquisition request from the printer 110. The firmware acquisition request includes designation of a printer model name and a firmware version. In step S1505, the vendor server 140 obtains the firmware requested by the printer 110 from the information storage unit 342 by the processing of the firmware management unit 341. In step S1506, the vendor server 140 transmits the obtained firmware to the printer 110, and ends the processing.

The printer 110 may perform the processing of the first and second API version checks when updating the printer information, not during printer registration. Examples of the timing at which the printer 110 updates the print information include when the printer 110 regularly notifies the printing service 330 of the printer information and when the printing service 330 and the printer 110 perform print processing therebetween. Other examples may include timing at which communication occurs between the printer 110 and the printing service 330, like when the printer 110 notifies the printing service 330 of a status of the printer 110 and/or counter information. If the printer 110 performs the processing of the first and second API version checks when updating the printer information, the processing is similar to that of steps S1001 to S1018 of the first exemplary embodiment (FIG. 8) except step S1003. Only the processing of step S1003 is different from the processing during printer registration. In the processing of step S1003 in FIG. 8, processing for updating the printer information is performed instead of the processing for registering a new printer.

The processing of the printer 110 is similar to that of the flowchart illustrated in FIG. 13 except step S1303. Only the processing of step S1303 is different from the processing during registration. In step S1303, the printer 110 performs processing for updating the printer information. The processing of the printing service 330 is similar to that of the flowchart illustrated in FIG. 15 except step S1404. Only the processing of step S1404 is different from the processing during registration. In step S1404, the printing service 330 performs processing for updating the print information. The processing of vendor server 140 is similar to the processing illustrated in FIG. 16.

As described above, according to the printing system 1000 according to the first exemplary embodiment, the printer 110 performs the first and second API version checks. Whether firmware appropriate for an API of the printing service 330 is registered on the vendor server 140 can thus be determined. Consequently, in the printing system 1000 where the printer 110 uses the printing service 330, the printer 110 can download the firmware that allows appropriate use of the printing service 330. This can avoid inconvenience that when an API is added to or disused by the printing service 330, an appropriate API cannot be used even if the user obtains the latest firmware from the vendor server 140 and updates the printer 110.

In the present exemplary embodiment, the screens illustrated in FIGS. 10A to 10D are displayed on the panel of the printer 110 so that the user can give an instruction to check firmware and download the firmware to the vendor server 140. However, the configuration of the first exemplary embodiment is not restrictive. The printer 110 may be configured to be able to automatically perform all the processing for checking the vendor server 140 for firmware and downloading the firmware without displaying the screens illustrated in FIGS. 10A to 10D. For example, if, in step S1007, the printer 110 is determined not to be using an appropriate API of the printing service 330, the printer 110 may advance the processing to step S1009 and obtain the firmware information from the vendor server 140 without displaying the firmware check instruction screen illustrated in FIG. 10A in step S1008. If, in step S1011, firmware on the vendor server 140 is determined to be able to use an appropriate API, the printer 110 advances the processing to step S1013 without displaying the firmware update confirmation screen illustrated in FIG. 10B or 10C in step S1012. If there is a plurality of pieces of appropriate firmware, the printer 110 may designate the latest one of the pieces of appropriate firmware and request the vendor server 140 to obtain the firmware.

The first exemplary embodiment has been described with reference to FIGS. 1 to 16. Some vendor servers 140 may provide firmware intended for special purposes. Firmware intended for a specific printer model may include a firmware version or versions with limited function. Some firmware may be intended for specific customers. In such cases, a printer 110 may not be able to use a printing service 330 even if the firmware is appropriate for an API version with which the printing service 330 can be used. The printer 110 needs to download firmware that corresponds to an API of the printing service 330 and is not intended for a special purpose from the vendor server 140. A method for solving such a problem will be described with reference to FIGS. 7C, 17, and 11A.

FIG. 17 is a flowchart illustrating a second API version check that the printer 110 performs according to a second exemplary embodiment. The second API version check of FIG. 17 is the second API version check of FIG. 12 to which a determination whether the firmware on the vendor server 140 is intended for a special purpose is added. In the second API version check illustrated in FIG. 17, the processing of steps S1601 to S1603 is similar to that of steps S1201 to S1203 described referring to FIG. 12.

In step S1603, if the printer 110 determines that the firmware registered on the vendor server 140 does not correspond to the API versions of the printing service 330 (NO in step S1603), the processing proceeds to step S1607. The processing of step S1607 is similar to that of step S1205. In step S1603, if the firmware registered on the vendor server 140 is determined to correspond to an API version of the printing service 330 (YES in step S1603), then in step S1604, the printer 110 determines whether the firmware on the vendor server 140 is intended for a special purpose. If the firmware is intended for a special purpose (YES in step S1604), the printer 110 performs the processing of step S1605. If the firmware is standard firmware intended for general purposes (NO in step S1604), the printer 110 performs the processing of step S1606.

In step S1605, the printer 110 stores information that "the firmware on the vendor server 140 is firmware intended for a special purpose and is thus unusable" in the information storage unit 311. To make a distinction between steps S1605 and S1607, the printer 110 stores false$_{-1}$ in the second API version check 533 of FIG. 6D as the result of step S1607. The printer 110 stores false$_{-2}$ as the result of step S1605. In step S1606, the printer 110 performs similar processing to that of step S1204 because the firmware registered on the vendor server 140 is standard firmware and can use the API of the printing service 330.

FIG. 11A illustrates a screen displayed on the panel of the printer 110 after the second API version check described in FIG. 17. The screen has a similar configuration to that of the firmware update confirmation screen illustrated in FIG. 10D, and includes an OK button 908. If the user presses the OK button 908, the printer 110 displays an initial screen (not illustrated). The screen of FIG. 11A displays a message that appropriate firmware intended for the printing service 330 has not been registered (released) on the vendor server 140 yet.

As described above, the printer 110 performs the first and second API version checks. In this way, whether firmware appropriate for an API of the printing service 330 is registered on the vendor server 140 can be determined. The printer 110 can download firmware that corresponds to an API of the printing service 330 and is not intended for a special purpose from the vendor server 140. This improves usability.

In a third exemplary embodiment, the printing service 330 performs the first API version check. The printer 110 receives a notification from the printing service 330 and performs the second API version check. Since the printing service 330 performs the first API version check, the printing system 1000 has a software configuration different from that illustrated in FIG. 3. In the third exemplary embodiment, the print server group 130 includes a firmware management unit 338 (not illustrated). The firmware management unit 338 of the print server group 130 performs the first API version check.

A sequence according to the third exemplary embodiment will be described. If an API that the printing service 330 provides is to be added or disused, the printing service 330 generates an event and starts processing. The printing service 330 initially refers to the data illustrated in FIG. 4B, extracts one of the registered printers 110, and performs the first API version check. FIG. 9 illustrates the flow of the first API version check, which is performed by the printing service 330 in the third exemplary embodiment as follows.

In step S1101 of FIG. 9, the printing service 330 obtains the API version 416 of the extracted printer 110 by the processing of the firmware management unit 338. In step S1102, the printing service 330 obtains the service API list 421 (FIG. 4C) by the processing of the firmware management unit 338. In step S1103, the printing service 330 determines whether the printer 110 is using an appropriate API by the processing of the firmware management unit 338.

The printing service 330 stores the determination result as data illustrated in FIG. 5A. More specifically, in the third exemplary embodiment, the printing service 330 retains the data (FIG. 5A) similar to the check result illustrated in FIG. 6D which the printer 110 retains. The printing service 330 stores the result of the first API version check for each printer. The data illustrated in FIG. 5A includes a printer name 431, a first API version check 432, and a second API version check 433. In the third exemplary embodiment, the second API version check 433 is not used. The printer name 431 is similar to the printer name 411 of FIG. 4A. The first API version check 432 is the result of the first API version check. The second API version check 433 is the result of the second API version check (no data).

In steps S1104 and S1105, the printing service 330 stores the result into the first API version check 432 of FIG. 5A in the information storage unit 334 by the processing of the firmware management unit 338. For example, the printing service 330 extracts the API version 416 (2.0) of the printer A, and compares the API version 416 with the service API list 421 illustrated in FIG. 4C. As a result of the comparison with the API versions (2.8, 2.9, and 3.0), the printing service 330 determines that the printer 110 is not using an appropriate API (NO in step S1103), and the processing proceeds to step S1105. In step S1103, if the printer 110 is determined to be using an appropriate API (YES in step S1103), the processing proceeds to step S1104. In step S1104, the firmware management unit 338 stores information that "an appropriate API is used" (true) into the first API version check 432 of FIG. 5A. In step S1105, the firmware management unit 338 stores information that "an appropriate API is not used" (false) into the first API version check 432 of FIG. 5A.

If the firmware management unit 338 determines that the printer 110 is not using an appropriate API, the printing service 330 notifies the printer 110 of the service API list 421 by using the IP address 413 (FIG. 4B). Upon receiving the notification, the printer 110 displays the firmware check instruction screen of FIG. 10A and detects a firmware check instruction. The printer 110 then requests the correspondence information about the registered firmware and the API versions of the printing service 330 from the vendor server 140. The vendor server 140 transmits the release information file 602 to the printer 110, whereby the printer 110 is notified of the correspondence information about the firmware and the API versions of the printing service 330. Here, the printer 110 performs the second API version check (in a similar manner to step S1011 of the first exemplary embodiment). If the printer 110 determines that there is firmware appropriately usable for the printing service 330 in the vendor server 140, the printer 110 displays a firmware update confirmation screen (in a similar manner to step S1012 of the first exemplary embodiment). The processing after the detection of a firmware update instruction by the printer 110 is similar to that of steps S1013 to S1018 described in the first exemplary embodiment.

The printer 110 according to the third exemplary embodiment receives the usable service API list (FIG. 4C) from the printing service 330. The subsequent processing is similar to that of the printer 110 in steps S1307 to S1322 described in the first exemplary embodiment. In the third exemplary embodiment, the printer 110 performs the second API version check. The processing of the vendor server 140 according to the third exemplary embodiment is similar to that illustrated in FIG. 16, described in the first exemplary embodiment.

As described above, in the third exemplary embodiment, the printing service 330 performs the first API version check and the printer 110 performs the second API version check. In this way, whether firmware appropriate for an API of the printing service 330 is registered on the vendor server 140 can be determined. This can avoid inconvenience that, when an API is added to or disused by the printing service 330, an appropriate API cannot be used even if the user obtains the latest firmware from the vendor server 140 and updates the printer 110. Since the printer 110 needs only to perform the second API version check, the load of the printer 110 is reduced.

In a fourth exemplary embodiment, the printing system 1000 includes printers 110, a client 120, a print server group 130, and a vendor site server group 140. In the fourth exemplary embodiment, the printing service 330 performs the first API version check, and displays a printer management screen (FIG. 18A) on the client 120 to notify the user of a printer or printers 110 that do not correspond to an appropriate API. The printing service 330 receives a firmware check instruction from the printer management screen, and notifies the printer(s) 110 of the firmware check instruction. The printer(s) 110 performs/perform the second API version check. The printing service 330 according to the fourth exemplary embodiment has a similar software configuration to that of the third exemplary embodiment.

FIG. 18A illustrates the printer management screen intended for a firmware check instruction, which is transmitted from the printing service 330 and displayed on the screen of the client 120. The printing service 330 performs the first API version check on all the printers 110 that are registered as linked with the same administrator user account, and transmits the printer management screen illustrated in FIG. 18A to the client 120. The printer management screen of FIG. 18A includes a message from the printing service 330, a printer selection section 1401, a check button 1402, and a check suspension button 1403. The printer selection section 1401 is intended to select a printer or printers 110 for which whether firmware having an API corresponding to the printing service 330 is registered on the vendor server 140 is checked. The check button 1402 is a button for giving an instruction to check firmware for the vendor server 140. The check suspension button 1403 is a button for giving an instruction not to check firmware for the vendor server 140.

FIG. 20 is a diagram illustrating a sequence according to the fourth exemplary embodiment. The printing service 330 starts processing when an event such as the addition of an API and the disuse of an API occurs in the printing service 330. In step S1701, the printing service 330 performs the first API version check on the registered printers 110. In the present exemplary embodiment, the printing service 330 successively performs the first API version check on the printers 110 associated with each printer-managing user account for managing printers so that an instruction to check for firmware can be given user by user on the printer management screen illustrated in FIG. 18A. For example, the printing service 330 extracts the printers A, B, and C registered linked with the user A based on the data illustrated in FIG. 4B. In step S1702, the printing service 330 extracts a printer or printers 110 that is/are using an inappropriate API. In the data example illustrated in FIG. 4B, the API versions of the printers A, B, and C are 1.0, 1.2, and 2.0. As a result of the first API version check using the service API list 421, the printers A, B, and C are determined to be using an inappropriate API.

In step S1703, the client 120 logs in to the printer management screen. In step S1704, the printing service 330 sends back the printer management screen illustrated in FIG. 18A to the client 120. In step S1705, if the user selects a printer or printers 110 in the printer selection section 1401 of the printer management screen, and presses the check button 1402 by using the client 120, then in step S1706, the client 120 transmits a firmware check instruction to the printing service 330. In step S1705, if the client 120 detects that the user presses the check suspension button 1403, then in step S1706, the client 120 does not transmit a firmware check instruction to the printing service 330.

In step S1707, the printing service 330 transmits the firmware check instruction to the printer(s) 110 selected in step S1705. Here, the printing service 330 also transmits the first API version check 432 and the service API list 421 to the printer(s) 110. The processing of steps S1708 to S1710 by the printer(s) 110 is similar to that of steps S1009 to S1011 according to the first exemplary embodiment. In step S1711, the printer(s) 110 transmits/transmit the result of the second API version check to the printing service 330 as firmware information.

In step S1712, the printing service 330 transmits the firmware information on the vendor server 140 to the client 120 as the printer management screen of FIG. 18B. FIG. 18B illustrates a printer management screen for giving an instruction to update firmware. The printer management screen of FIG. 18B includes a message from the printing service 330, a printer selection section 1404, a download button 1405, and a download suspension button 1406. The printer selection section 1404 is intended to select a printer or printers 110 to which firmware is to be do downloaded from the vendor server 140 to the printer(s) 110. The download button 1405 is a button for giving an instruction to download firmware from the vendor server 140. The download suspension button 1406 is a button for giving an instruction not to download firmware from the vendor server 140. If there is a plurality of pieces of appropriate firmware for a selected printer 110, the latest appropriate firmware is automatically selected. The user may select firmware to download from among a plurality of pieces of firmware in the following manner.

Suppose that the user selects the printer C and presses the download button 1405 in FIG. 18B. The printing service 330 transmits the printer management screen of FIG. 18C to the client 120. The printer management screen of FIG. 18C includes a firmware selection section 1407, a selection button 1408, and a cancel button 1409. The user selects firmware to be downloaded to the printer C in the firmware selection section 1407, and presses the selection button 1408 to give an instruction to update firmware. If the user presses the cancel button 1409, the printer management screen returns to that of FIG. 18B.

In step S1710, if no firmware corresponding to an appropriate API is determined to be on the vendor server 140, then in step S1712, the printing service 330 transmits the printer management screen of FIG. 18D to the client 120. FIG. 18D illustrates a printer management screen for notifying the user that firmware appropriate for the APIs of the printing service 330 is not registered on the vendor server 140. The printer management screen illustrated in FIG. 18D may display a notification date. The printer management screen illustrated in FIG. 18D includes an OK button 1410. If the user presses the OK button 1410, the printer management screen displays an initial screen (FIG. 18F). The initial screen illustrated in FIG. 18F includes a print button 1412, a deletion button 1413, a detail button 1414, and a printer selection section 1415.

In step S1714 of FIG. 20, the client 120 transmits a firmware update instruction including designation of a printer or printers 110 to the printing service 330. In step S1715, the printing service 330 transmits the firmware update instruction to the designated printer(s) 110. The processing of the subsequent steps S1716 to S1721 is similar to that of steps S1013 to S1018 according to the first exemplary embodiment. In step S1722, the printing service 330 notifies the client 120 of the firmware update result of the printer(s) 110. FIG. 18E illustrates an example of a printer management screen displaying an update result. The printer management screen of FIG. 18E includes a message from the printing service 330 and an OK button 1411. If the user presses the OK button 1411, the printer management screen displays the initial screen (FIG. 18F). In step S1723, the client 120 logs out from the printer management screen, and then the processing ends.

FIG. 21 is a flowchart illustrating the processing by the client 120 according to the fourth exemplary embodiment. In step S1801, the client 120 accesses a printer management screen provided by the printing service 330 via the web browser 320. In step S1802, the client 120 obtains the printer management screen (FIG. 18A). In step S1803, the client 120 detects a firmware check instruction including designation of a printer or printers 110. In step S1804, the client 120 transmits the firmware check instruction including the designation of the printer(s) 110 to the printing service 330.

In step S1805, the client 120 receives firmware information appropriate for the printer(s) 110 from the printing service 330. In step S1806, the client 120 detects a firmware update instruction including designation of firmware of the printer(s) 110. In step S1807, the client 120 transmits the firmware update instruction including the designation of the firmware of the printer(s) 110 to the printing service 330. In step S1808, the client 120 receives a firmware update result of the printer(s) 110 from the printing service 330. In step S1809, the client 120 logs out from the printer management screen, and then ends the processing.

The processing of a printer 110 according to the fourth exemplary embodiment will be described. The printer 110 receives the result of the first API version check, the service API list 421, and a firmware check instruction from the printing service 330. The printer 110 obtains the vendor URL 505 from the information storage unit 311, and accesses the vendor server 140 to inquire about the API version of the printing service 330 to which the firmware intended for the printer 110 corresponds. The printer 110 receives the release information file 602 and obtains the API version of the printing service 330 to which the firmware corresponds. The printer 110 performs the second API version check.

The printer 110 determines whether firmware having an API appropriate for the printer 110 to use the printing service 330 is present on the vendor server 140. If there is appropriate firmware, the printer 110 extracts the information about the firmware corresponding to the appropriate API, and stores the data as illustrated in FIGS. 6C and 6D. If there is no appropriate firmware, the printer 110 stores information about the absence of appropriate firmware into the second API version check 533 illustrated in FIG. 6D. The printer 110 transmits the firmware information on the vendor server 140 to the printing service 330. The printer 110 subsequently receives a firmware update instruction including designation of firmware from the printing service 330. The subsequent processing is similar to the processing of steps S1317 to S1319, S1321, and S1322 according to the first exemplary embodiment. In the fourth exemplary embodiment, the operations and instructions intended by the user are made and given by using the client 120. Therefore, printers 110 do not need to make a screen display on their panel. The processing of the vendor server 140 according to the fourth exemplary embodiment is similar to that described in the first exemplary embodiment, illustrated in FIG. 16.

As described above, in the fourth exemplary embodiment, the printing service 330 performs the first API version check, and the printers 110 perform the second API version check. The client 120 checks the firmware on the vendor server 140 and gives firmware update instructions to the printers 110. In such a manner, whether firmware appropriate for an API of the printing service 330 is registered on the vendor server 140 can be determined. This can avoid inconvenience that when an API is added to or disused by the printing service 330, an appropriate API cannot be used even if the user obtains the latest firmware from the vendor server 140 and updates the printer 110.

In a fifth exemplary embodiment, a printing service 330 performs the first and second API version checks when a printer 110 registers the printer 110 in the printing service 330. In the present exemplary embodiment, the printing system 1000 includes a print server group 130, printers 110, and a vendor site server group 140. If the printing service 330 determines that the printer 110 is not using firmware appropriate to use the printing service 330 and there is appropriate firmware on the vendor server 140, the printing service 330 prompts the printer 110 to update the firmware. The printing system 1000 has a software configuration obtained by adding functions to the software configuration illustrated in FIG. 3 so that the printing service 330 performs the second API version check. The print server group 130 includes a firmware management unit 338 (not illustrated).

The firmware management unit 338 can communicate with the web application 340 of the vendor server 140.

Figure 22:
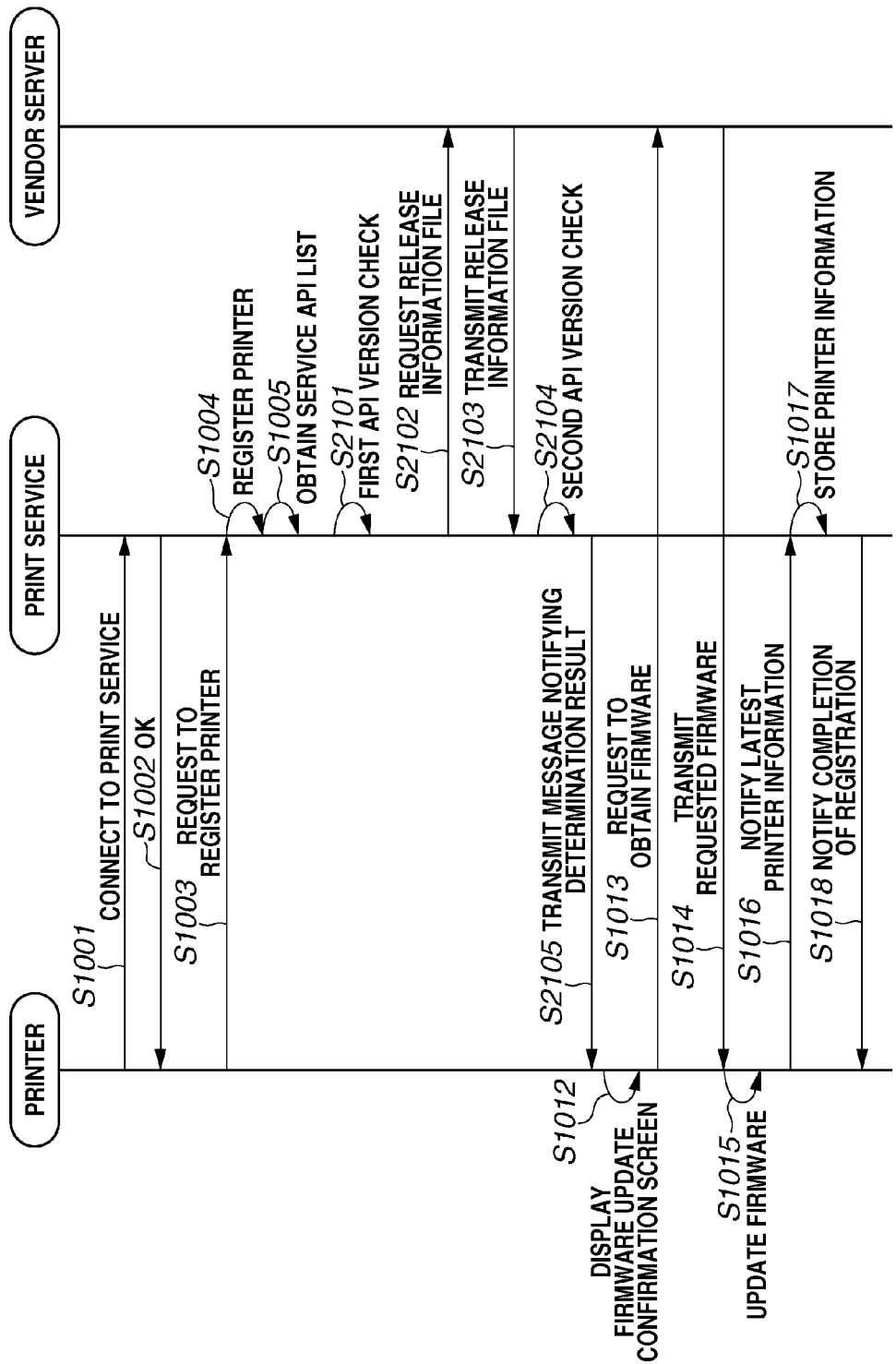
FIG. 22 is a diagram illustrating a sequence according to a fifth exemplary embodiment.

A sequence according to the fifth exemplary embodiment will be described with reference to FIG. 22. The processing of steps S1001 to S1005 is similar to that described with reference to FIG. 8. A description thereof is thus omitted. In step S2101, the printing service 330 performs the first API version check described with reference to FIG. 9. If, as a result of the first API version check, the firmware installed in the printer 110 is determined to be appropriate, the printing service 330 transmits a notification of the completion of printer registration to the printer 110. If, as a result of the first API version check, the firmware of the printer 110 is determined to be inappropriate, then in step S2102, the printing service 330 accesses the vendor server 140 by using the vendor URL 505 that has been received from the printer 110 and stored therein.

The printing service 330 inquires of the vendor server 140 about the API version(s) of the registered firmware. In other words, in the fifth exemplary embodiment, the printing service 330 requests the resource information file 602. In step S2103, the vendor server 140 transmits the release information file 602 (FIG. 7A) to the printing service 330. The release information file 602 includes the API version(s) of the firmware. The printing service 330 stores the information about the release information file 602 into the information storage unit 334. In the fifth exemplary embodiment, the printing service 330 stores data illustrated in FIG. 5C. Here, the printing service 330 stores a printer name 451, a printer model name 452, an appropriate firmware version 453, and a corresponding API version 454. If there is a plurality of pieces of appropriate firmware, the information storage unit 334 may store a plurality of appropriate firmware versions 453 and a plurality of corresponding API versions 454.

In step S2104, the printing service 330 performs the second API version check described with reference to FIG. 12. Specifically, in step S1201 of FIG. 12, the printing service 330 obtains the service API list 421 by the processing of the firmware management unit 338. In step S1202, the printing service 330 obtains the API version(s) 454 of the printing service 330 to which the firmware registered on the vendor server 140 corresponds. In step S1203, the printing service 330 determines whether the firmware registered on the vendor server 140 corresponds to an API provided by the printing service 330 by the processing of the firmware management unit 338.

In steps S1204 and S1205, the printing service 330 stores the result into the second API version check 443 illustrated in FIG. 5A in the information storage unit 334 by the processing of the firmware management unit 338. In step S1203, if the firmware registered on the vendor server 140 is determined to correspond to an API of the printing service 330 (YES in step S1203), then in step S1204, the printing service 330 stores information that "the firmware on the vendor server can use an appropriate API" (true). The printing service 330 stores an appropriate firmware version 442 and a corresponding service API version of appropriate firmware 443 illustrated in FIG. 5B. The printing service 330 further stores a printer model name 441 of the registered printer 110 as illustrated in FIG. 5B.

In step S1203, if the firmware registered on the vendor server 140 is determined not to correspond to the APIs of the printing service 330 (NO in step S1203), then in step S1205, the printing service 330 stores information that "the firmware on the vendor server cannot use an appropriate API"

(false). After the completion of the processing of step S1204 or S1205, the API version check by the printing service 330 ends.

In step S2105, the printing service 330 transmits a message notifying the determination result to the printer 110. If the content of the notification that the printer 110 receives from the printing service 330 is about a firmware update instruction, then in step S1012, the printer 110 displays the firmware update confirmation screen (FIG. 10C) and detects the operation instruction from the user. If the content of the operation instruction from the user is to give an instruction to update firmware, the sequence according to the fifth exemplary embodiment performs similar processing to that of steps S1013 to S1018 according to the first exemplary embodiment. The printing service 330 may notify the client 120 by e-mail of the content of the notification given to the printer 110.

In the fifth exemplary embodiment, the printer 110 receives three kinds of notifications from the printing service 330. A first notification is a notification for confirming whether to perform firmware update. A second notification is a notification for notifying that the firmware of the printer 110 is inappropriate or that appropriate firmware is not registered on the vendor server 140 and firmware update cannot be performed. A third notification is a notification about the completion of registration of the printer information in the printing service 330. If the first notification is determined to be received, the printer 110 displays the firmware update confirmation screen (FIG. 10B) on the panel. If the second notification is determined to be received, the printer 110 displays the content of the second notification on the panel to notify the user that firmware corresponding to an API appropriate to use the printing service 330 is not registered on the vendor server 140 (FIG. 11B).

As described above, in the fifth exemplary embodiment, the printing service 330 performs the first and second API version checks. As a result, whether firmware of a printer 110 appropriate for an API of the printing service 330 is registered on the vendor server 140 can be determined. This can avoid inconvenience that when an API is added to or disused by the printing service 330, an appropriate API cannot be used even if the user obtains the latest firmware from the vendor server 140 and updates the printer 110.

When the printing service 330 updates printer information, the printing service 330 may determine whether the API of the printer 110 matches with an API of the printing service 330 and update the firmware. The printing system 1000 according to a sixth exemplary embodiment includes printers 110, a client 120, a print server group 130, and a vendor server 140. The sixth exemplary embodiment differs from the fifth exemplary embodiment in the timing at which the printing service 330 activates the processing for the first and second API version checks and in that the client 120 is added. While the fifth exemplary embodiment deals with the processing when registering a new printer 110, the sixth exemplary embodiment deals with processing when updating printer information about a printer 110 that has been registered in the printing service 330. Examples of the timing at which the printer information is updated include when the printer 110 regularly notifies the printing service 330 of the printer information and when the printing service 330 and the printer 110 perform print processing therebetween. Other examples include s timing when communication occurs between the printer 110 and the printing service 330, like when the printer 110 notifies the printing service 330 of a status of the printer 110 and/or counter information.

Processing by the printer 110 according to the sixth exemplary embodiment will be described. In the fifth exemplary embodiment, the printer 110 is described to initially perform the processing of steps S1301 to S1303 described in FIG. 13 of the first exemplary embodiment. In the sixth exemplary embodiment, the printer 110 performs processing for updating the print information in step S1303. In other respects, the processing of the printer 110 is similar to that of the fifth exemplary embodiment.

Processing by the printing service 330 according to the sixth exemplary embodiment will be described. In the fifth exemplary embodiment, the printing service 330 is described to initially perform the processing of steps S1401 to S1404 described in FIG. 15 of the first exemplary embodiment. In the sixth exemplary embodiment, the printing service 330 updates the print information in step S1404. In other respects, the processing of the printing service 330 is similar to that of the fifth exemplary embodiment. The processing of the vendor server 140 according to the sixth exemplary embodiment is similar to that described in the fifth exemplary embodiment.

As described above, in the sixth exemplary embodiment, the printing service 330 performs the first and second API version checks. Whether firmware of a printer 110 appropriate for an API of the printing service 330 is registered on the vendor server 140 can thus be determined. This can avoid inconvenience that when an API is added to or disused by the printing service 330, an appropriate API cannot be used even if the user obtains the latest firmware from the vendor server 140 and updates the printer 110.

In a seventh exemplary embodiment, the printing service 330 performs the first and second API version checks. The printing system according to the seventh exemplary embodiment has a similar configuration to that of the sixth exemplary embodiment. Unlike the sixth exemplary embodiment, the printing service 330 does not display the printer management screen illustrated in FIG. 18A. Instead, the printer service 330 provides the printer management screen of FIG. 18B to notify the user of a printer or printers 110 in which firmware corresponding to an appropriate API is not installed. Based on a firmware update instruction that the user gives via the printer management screen by using the client 120, the printing service 330 instructs the printer(s) 110 to update firmware.

A sequence according to the seventh exemplary embodiment will be described. The printing service 330 starts processing when the printing service 330 generates an event such as addition and disuse of an API. The printing service 330 performs the first API version check on the registered printers 110 in a similar manner to the sixth exemplary embodiment. The printing service 330 performs the second API version check on a printer or printers 110 that is/are using inappropriate firmware. Next, the client 120 logs in to a printer management screen. The printing service 330 sets the printer management screen according to the results of the first and second API version checks. If all the printers displayed on the printer management screen linked with the user are using appropriate firmware, the printing service 330 sets the normal printer management screen illustrated in FIG. 18F.

If a printer or printers 110 displayed on the printer management screen is/are using inappropriate firmware and appropriate firmware is registered on the vendor server 140, the printing service 330 transmits the printer management screen illustrated in FIG. 18B to the client 120. If a printer or printers 110 displayed on the printer management screen is/are using inappropriate firmware and appropriate firmware is not registered on the vendor server 140, the printing service 330 transmits a printer management screen illustrated in FIG. 19A to the client 120.

FIG. 19A illustrates a printer management screen for notifying the user that appropriate firmware is not registered on the vendor server 140. The printer management screen illustrated in FIG. 19A includes a message from the printing service 330, a print button 1416, a deletion button 1417, a detail button 1418, and a printer selection section 1419. Suppose here that the printing service 330 transmits the printer management screen illustrated in FIG. 18B to the client 120. The client 120 displays the printer management screen illustrated in FIG. 18B, and detects a firmware update instruction given by a user operation, including designation of a printer or printers 110. The client 120 transmits the firmware update instruction including the designation of the printer(s) 110 to the printing service 330.

If the printing service 330 receives a firmware update instruction, the printing service 330 notifies the client 120 of a start of firmware update processing (FIG. 19B). The printer management screen illustrated in FIG. 19B explicitly displays that the printer 110 performing the firmware update processing is not operable. The printing service 330 instructs the printer 110 to update firmware. If a plurality of printers 110 is designated by the operation of the client 120, the firmware update processing is performed on the plurality of printers 110. The subsequent processing is similar to the processing of steps S1715 to S1721 described referring to FIG. 20 of the fourth exemplary embodiment. The printing service 330 transmits a printer management screen illustrated in FIG. 19C to notify the client 120 of the completion of the firmware update processing.

As described above, in the seventh exemplary embodiment, the printing service 330 performs the first and second API version checks. Unlike the sixth exemplary embodiment, the printer management screen (FIG. 18B) is displayed after the first and second API version checks. The printer management screen displays only a printer or printers 110 of which firmware corresponding to a usable API version of the printing service 330 exists. This simplifies the user operations with an effect of improved usability in addition to the effects of the foregoing exemplary embodiments.

In an eighth exemplary embodiment, the printing service 330 performs the first and second API version checks. If the printing service 330 determines that a printer or printers 110 is/are not using firmware appropriate to use the printing service 330 and appropriate firmware is registered on the vendor server 140, the printing service 330 prompts the printer(s) 110 to update the firmware. The printing system 1000 according to the eighth exemplary embodiment has a similar software configuration to that of the fifth exemplary embodiment.

A sequence according to the eighth exemplary embodiment will be described. The printing service 330 starts processing when the printing service 330 generates an event such as addition and disuse of an API. The printing service 330 performs the first and second API version checks in a similar manner to the seventh exemplary embodiment. The printing service 330 then instructs each extracted printer 110 to update firmware. The processing so far is similar to that of steps up to S2105 according to the fifth exemplary embodiment, described with reference to FIG. 22. In the eighth exemplary embodiment, the printer 110 receiving the update instruction displays the firmware update confirmation screen (FIG. 10C) on the panel and waits for a user operation. A mechanism for notifying the user of the display of the firmware update confirmation screen (FIG. 10C) on the panel of the printer 110 is thus needed. The printing service 330 generates a printer management screen such as that illustrated in FIG. 19D or 19E to notify the user of the display when the second API version check is completed.

FIG. 19D is a diagram illustrating a printer management screen on which a message prompting firmware update of a printer or printers 110 is displayed. FIG. 19E is a diagram illustrating a printer management screen on which a message that an old API or APIs will become unusable, and prompting firmware update, is displayed. When ending the sequence, the printing service 330 may generate a printer management screen illustrated in FIG. 19F to notify the user of the completion of the firmware update. The printer(s) 110 may automatically start to obtain firmware without displaying the firmware update confirmation screen (FIG. 10C). Even if the firmware is automatically updated, the printing service 330 generates the printer management screen of FIG. 19F to notify the user of the completion of the firmware update. The printing service 330 may notify the user of such messages by using electronic mails.

The processing by the printing service 330 according to the eighth exemplary embodiment will be described. The printing service 330 starts the processing by generating an event such as addition and disuse of an API. The printing service 330 performs the first and second API version checks in a similar manner to the processing of the seventh exemplary embodiment. The processing on the extracted printer(s) 110 not using an appropriate API is similar to that of the printing service 330 in the fifth or sixth exemplary embodiment. The printing service 330 generates a printer management screen such as that illustrated in FIG. 19D or 19E and notifies the user of the display when the second API version check is completed.

The processing by a printer 110 according to the eighth exemplary embodiment will be described. The printer 110 receives an update instruction from the printing service 330 and displays the firmware update confirmation screen (FIG. 10C). The printer 110 may receive information about an instruction to generate the firmware update confirmation screen, accompanied with appropriate firmware information. The printer 110 displays the firmware update confirmation screen (FIG. 10C) on the panel. The processing by the printer 110 after the display of the firmware update confirmation screen (FIG. 10C) is similar to that of the printer 110 according to the fifth exemplary embodiment. The processing of the vendor server 140 according to the eighth exemplary embodiment is similar to that described in the fifth exemplary embodiment.

As described above, in the eighth exemplary embodiment, the printing service 330 performs the first and second version checks. Whether firmware of a printer 110 appropriate for an API of the printing service 330 is registered on the vendor server 140 can thus be determined. This can avoid inconvenience that when an API is added to or disused by the printing service 330, an appropriate API cannot be used even if the user obtains the latest firmware from the vendor server 140 and updates the printer 110.

In the eighth exemplary embodiment, the printing service 330 performs the second API version check on each registered individual printer 110. In a ninth exemplary embodiment, before the second API version check, the printing service 330 performs the first API version check not for each printer but for each printer model. Such an API version check will be referred to as a third API version check (third determination). If firmware corresponding to an API of the printing service 330 is installed in a model, the printing service 330 does not need to obtain correspondence information about the model from the vendor server 140. This can reduce the number of accesses to the vendor server 140.

The printing service 330 stores a model-by-model firmware management table (FIG. 5D) in the information storage unit 334. The firmware management table illustrated in FIG. 5D includes a printer model name 461, a firmware version 462, an API version 463, a vendor URL 464, and a third API version check 465. The printer model name 461, the firmware version 462, the API version 463, and the vendor URL 464 are similar to the data designated by the reference numerals 414 to 417 in FIG. 4B.

The third API version check 465 is the result of the third API version check performed by the printing service 330 in the ninth exemplary embodiment. By the third API version check, the printing service 330 determines firmware that does not correspond to an appropriate API. The printing service 330 then performs the second API version check on the printer model(s) having the inappropriate firmware to check whether firmware corresponding to an appropriate API is registered on the vendor server 140. Next, the printing service 330 extracts a printer or printers 110 of which firmware corresponding to an appropriate API is registered on the vendor server 140 and in which inappropriate firmware is installed. The printing service 330 transmits a notification prompting update to appropriate firmware to the printer(s) 110. The printing system 1000 according to the ninth exemplary embodiment has a similar software configuration to that of the fifth exemplary embodiment.

FIG. 23 is a flowchart illustrating the third API version check by the printing service 330 according to the ninth exemplary embodiment. In step S1901, the printing service 330 obtains the API version 463 to which each piece of firmware corresponds from the model-by-model firmware management table (FIG. 5D). In step S1902, the printing service 330 obtains the service API list 421. In step S1903, the printing service 330 determines whether each piece of firmware corresponds to an appropriate version of API. For example, the API version of the printer model name AAA-Print-200 is 2.0. The printing service 330 compares the API version with the service API list 421 (3.0, 2.9, and 2.8), and determines that the API version of AAA-Print-200 does not correspond to an appropriate API version. In step S1903, if the firmware is determined to correspond to an appropriate version of API (YES in step S1903), then in step S1904, the printing service 330 stores information that an appropriate API is used (true) into the third API version check 465. In step S1903, if the firmware is determined to correspond to an inappropriate version of API (NO in step S1903), then in step S1905, the printing service 330 stores information that an appropriate API is not used (false) into the third API version check 465.

FIG. 24 is a flowchart illustrating a sequence according to the ninth exemplary embodiment. The printing service 330 starts processing by generating an event such as addition and disuse of an API. In step S2001, the printing service 330 obtains the model-by-model firmware information (FIG. 5D). In step S2002, the printing service 330 performs the third API version check. If there is an appropriate API version, then in step S2003, the printing service obtains the vendor URL 464 from printer information about a printer 110 of the extracted model, and obtains correspondence information about the model from the vendor server 140.

In step S2004, the printing service 330 receives the release information file 602 from the vendor server 140. In step S2005, the printing service 330 performs the second API version check. As a result of the second API version check, if there is firmware that can use an appropriate API, the firmware information is added as illustrated in FIG. 5E. As for the third API version check 465 of the added firmware, information that the firmware is appropriate (true) is recorded. The printing service 330 will not update the firmware information if firmware that can use an appropriate API is not found.

After the completion of step S2005, in step S2006, the printing service 330 extracts a printer or printers 110 of which firmware corresponding to an appropriate API is registered on the vendor server 140 and in which inappropriate firmware is installed. The printing service 330 can extract such a printer(s) 110 by performing the first API version check. In step S2007, the printing service 330 transmits a notification prompting to update to the appropriate firmware to the extracted printer(s) 110. In step S2008, the printer(s) 110 displays/display the firmware update confirmation screen (FIG. 10C) on the panel. The processing after step S2008 is similar to the flow of the processing described in the fifth exemplary embodiment. Like the eighth exemplary embodiment, a mechanism for notifying the user of the display of the firmware update confirmation screen (FIG. 10C) on the panel of the printer(s) 110 is needed in the ninth exemplary embodiment. The mechanism for notifying the user of the display may be implemented by a similar method to that described in the eighth exemplary embodiment. Like the eighth exemplary embodiment, the printer(s) 110 may automatically start to obtain the firmware without displaying the firmware update confirmation screen (FIG. 10C). The processing of the printers 110 according to the ninth exemplary embodiment is similar to that of the printers 110 according to the eighth exemplary embodiment. The processing of the vendor server 140 according to the ninth exemplary embodiment is similar to that described in the fifth exemplary embodiment.

As described above, in the ninth exemplary embodiment, the printing service 330 performs the first, second, and third API version checks. Whether firmware of a printer 110 appropriate for an API of the printing service 330 is registered on the vendor server 140 can thus be determined. This can avoid inconvenience that when an API is added to or disused by the printing service 330, an appropriate API cannot be used even if the user obtains the latest firmware from the vendor server 140 and updates the printer 110.

In a tenth exemplary embodiment, the vendor server 140 performs the first and second API version checks. The printing system 1000 according to the tenth exemplary embodiment has a similar configuration to that of the printing system 1000 according to the fifth exemplary embodiment. Referring to FIG. 22, a sequence according to the tenth exemplary embodiment will be described with a focus on differences from the fifth exemplary embodiment.

The processing of steps S1001 to S1005 is similar to that of the fifth exemplary embodiment. After the registration of the printer 110, the printing service 330 transmits the information about the printer (FIG. 4B) and the service API list 421 (FIG. 4C) to the vendor server 140. The vendor server 140 receives the information about the printer 110 and the service API list 421 by the processing of the firmware management unit 341, and performs the first API version check described in FIG. 9. If the vendor server 140 determines that the printer 110 is using an appropriate API version, the vendor server 140 stores true into the first API version check 432 illustrated in FIG. 5A. If the vendor server 140 determines that the printer 110 is not using an appropriate API version, the vendor server 140 stores false into the first API version check 432 illustrated in FIG. 5A. In other words, in the tenth exemplary embodiment, the vendor server 140 stores the data illustrated in FIG. 5A into the information storage unit 342.

If the vendor server 140 determines that the printer 110 is not using an appropriate API version, the vendor server 140 performs the second API version check. Specifically, the vendor server 140 obtains the release information file 602 illustrated in FIG. 7A from the information storage unit 342 and determines whether an API version listed in the service API list 421 exists. If such an API version is determined to exist, the vendor server 140 stores true in the second API version check 433 illustrated in FIG. 5A. If no such API version is determined to exist, the vendor server 140 stores false in the second API version check 433 illustrated in FIG. 5A. If such an API version is determined to exist, the vendor server 140 obtains the firmware version corresponding to the API version listed in the service API list 421. Based on the results of the first and second API version checks, the vendor server 140 transmits the following information to the printing service 330. The information for the vendor server 140 to transmit includes information indicating that the firmware currently installed in the printer 110 does not correspond to the API versions of the printing service 330 and information indicating that the firmware corresponding to an API version of the printing service 330 is registered on the vendor server 140. Obtaining the two pieces of information, the printing service 330 generates the firmware update confirmation screen illustrated in FIG. 10B or 10C, and transmits the firmware update confirmation screen to the printer 110. The subsequent processing of steps S1012 to S1018 is similar to that of the fifth exemplary embodiment.

As described above, in the tenth exemplary embodiment, the vendor server 140 performs the first and second API version checks. This can avoid inconvenience that when an API is added to or disused by the printing service 330, an appropriate API cannot be used even if the user obtains the latest firmware from the vendor server 140 and updates the printer 110.

Other Embodiments

Exemplary embodiments of the present invention may be implemented by performing the following processing. The processing includes providing software (computer program) for implementing the functions of the foregoing exemplary embodiments to a system or an apparatus via a network or various types of recording media. A computer (or CPU or micro processing unit (MPU)) of the system or apparatus then reads and executes the program. In such a case, the program and the recording medium storing the program constitute exemplary embodiments of the present invention.

According to a printing system of an exemplary embodiment of the present invention, in a system where a printer uses a printing service, the printer can download firmware that allows appropriate use of the printing service.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-114266 filed May 30, 2013, which is hereby incorporated by reference herein in its entirety.

What is claimed is:

1. A printing system including a printing service apparatus configured to provide a printing service in which an API version is defined, an image forming apparatus configured to cooperate with the printing service apparatus, and a distribution server configured to distribute firmware corresponding to the printing service apparatus, the printing system comprising:
   at least a processor and at least a memory coupled to the at least the processor and having stored thereon instructions, when executed by the at least the processor, and cooperating to act as:
   a first determination unit configured to, when information about the image forming apparatus is registered in the printing service apparatus, determine whether firmware installed in the image forming apparatus corresponds to the printing service apparatus;
   a second determination unit configured to, if the first determination unit determines that the firmware installed in the image forming apparatus does not correspond to the printing service apparatus, determine whether firmware corresponding to the printing service apparatus exists in firmware of the image forming apparatus distributed by the distribution server;
   a third determination unit configured to, if the second determination unit determines that the firmware corresponding to the printing service apparatus exists, determine whether the existing firmware is a special purpose firmware;
   a control unit configured to, if the third determination unit determines that the existing firmware is not the firmware intended for a special purpose and when that existing firmware is distributed from the distribution server to the image forming apparatus, install the distributed firmware, and if the third determination unit determines that the existing firmware is the firmware intended for a special purpose, display information indicating that the printing service apparatus is unusable on a screen of the image forming apparatus; and
   a notification unit configured to, according to the distributed firmware having been installed in the image forming apparatus by the control unit, give notice that the information about the image forming apparatus has been registered in the printing service apparatus,
   wherein if the first determination unit determines that the firmware installed in the image forming apparatus corresponds to the printing service apparatus, the second determination unit does not perform the determination, the control unit does not update the firmware, and the notification unit gives notice that the information about the image forming apparatus has been registered in the printing service apparatus, and wherein firmware determined by the third determination unit as the special purpose firmware is a specific customer firmware, and differs from a general purpose firmware.

2. The printing system according to claim 1,
wherein the second determination unit is configured to determine whether the firmware corresponding to the printing service apparatus exists in the firmware distributed by the distribution server by comparing the API version to which the firmware distributed by the distribution server corresponds with the API version provided by the printing service apparatus, and wherein the control unit is configured to, if the second determination unit determines that the firmware corresponding to the printing service apparatus exists and when the firmware corresponding to the API version of the printing service apparatus is distributed from the distribution server to the image forming apparatus, install the distributed firmware.

3. The printing system according to claim 1, wherein if the second determination unit determines that no firmware corresponding to the printing service apparatus exists in the firmware of the image forming apparatus, information indicating that the printing service apparatus is unusable is displayed on the screen of the image forming apparatus.

4. The printing system according to claim 1, further comprising a user apparatus configured to manage the image forming apparatus, wherein the first determination unit is configured to extract an image forming apparatus linked with the user apparatus and determine whether firmware installed in each of the extracted image forming apparatus corresponds to the printing service apparatus, wherein the second determination unit is configured to, if there is an image processing apparatus or image forming apparatuses of which the firmware does not correspond, determine for each of the image forming apparatus of which the firmware does not correspond whether firmware corresponding to the printing service apparatus exists in firmware of the image forming apparatus distributed by the distribution server, wherein the control unit is configured to, if the firmware corresponding to the printing service apparatus is determined to exist, notify the user apparatus of the image forming apparatus of which the firmware corresponding to the printing service apparatus exists, and wherein the user apparatus is configured to display the notified image forming apparatus and a selection screen for selecting an image forming apparatus to install the firmware in.

5. The printing system according to claim 1, wherein all or some of the first determination unit, the second determination unit, the third determination unit, and the control unit are included in the printing service apparatus or the image forming apparatus.

6. A control method of a printing system including a printing service apparatus configured to provide a printing service in which an API version is defined, an image forming apparatus configured to cooperate with the printing service apparatus, and a distribution server configured to distribute firmware corresponding to the printing service apparatus, the control method comprising:

a first determining whether firmware installed in the image forming apparatus corresponds to the printing service apparatus, when information about the image forming apparatus is registered in the printing service apparatus;

a second determining whether firmware corresponding to the printing service apparatus exists in firmware of the image forming apparatus distributed by the distribution server, when information about the image forming apparatus is registered in the printing service apparatus or when information about the image forming apparatus already registered in the printing service apparatus is updated;

a third determining to, if the second determining determines that the firmware corresponding to the printing service apparatus exists, determine whether the existing firmware is a special purpose firmware;

installing the distributed firmware, if the third determining determines the firmware is not the firmware intended for a special purpose and when that the existing firmware is distributed from the distribution server to the image forming apparatus, and if the third determining determines that the existing firmware is the firmware intended for a special purpose, display information indicating that the printing service apparatus is unusable on a screen of the image forming apparatus; and notifying, according to the distributed firmware having been installed in the image forming apparatus, that the information about the image forming apparatus has been registered in the printing service apparatus, wherein if the first determining determines that the firmware installed in the image forming apparatus corresponds to the printing service apparatus, the second determining is not performed, the firmware is not updated, and notice is given that the information about the image forming apparatus has been registered in the printing service apparatus, and wherein firmware determined by the third determining as the special purpose firmware is a specific customer firmware, and differs from a general purpose firmware.

7. A non-transitory computer-readable storage medium storing a computer program that causes a computer to perform a control method of a printing system including a printing service apparatus configured to provide a printing service in which an API version is defined, an image forming apparatus configured to cooperate with the printing service apparatus, and a distribution server configured to distribute firmware corresponding to the printing service apparatus, the control method comprising:

a first determining whether firmware installed in the image forming apparatus corresponds to the printing service apparatus, when information about the image forming apparatus is registered in the printing service apparatus;

a second determining whether firmware corresponding to the printing service apparatus exists in firmware of the image forming apparatus distributed by the distribution server, when information about the image forming apparatus is registered in the printing service apparatus or when information about the image forming apparatus already registered in the printing service apparatus is updated;

a third determining to, if the second determining determines that the firmware corresponding to the printing service apparatus exists, determine whether the existing firmware is a special purpose firmware;

installing the distributed firmware, if the third determining determines the firmware is not the firmware intended for a special purpose and when that the existing firmware is distributed from the distribution server to the image forming apparatus, and if the third determining determines that the existing firmware is the firmware intended for a special purpose, display information indicating that the printing service apparatus is unusable on a screen of the image forming apparatus: and notifying, according to the distributed firmware having been installed in the image forming apparatus, that the information about the image forming apparatus has been registered in the printing service apparatus wherein if the first determining determines that the firmware installed in the image forming apparatus corresponds to the printing service apparatus, the second determining is not performed, the firmware is not updated, and notice is given that the information about the image forming apparatus has been registered in the printing service apparatus, and wherein firmware determined by the third determining as the special purpose firmware is a specific customer firmware, and differs from a general purpose firmware.

* * * * *